United States Patent
Minnick

(10) Patent No.: US 10,171,861 B2
(45) Date of Patent: *Jan. 1, 2019

(54) RECORDING OF MULTIPLE TELEVISION CHANNELS

(71) Applicant: DISH Technologies L.L.C., Englewood, CO (US)

(72) Inventor: Danny Jean Minnick, Castle Rock, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,452

(22) Filed: Nov. 16, 2017

(65) Prior Publication Data

US 2018/0084296 A1 Mar. 22, 2018

Related U.S. Application Data

(63) Continuation of application No. 15/143,999, filed on May 2, 2016, now Pat. No. 9,854,291, which is a
(Continued)

(51) Int. Cl.
*H04N 7/16* (2011.01)
*H04N 21/4147* (2011.01)
(Continued)

(52) U.S. Cl.
CPC ....... *H04N 21/4147* (2013.01); *G11B 27/026* (2013.01); *G11B 27/28* (2013.01);
(Continued)

(58) Field of Classification Search
CPC ......... H04N 21/4147; H04N 21/47202; H04N 21/4335; H04N 21/4302; H04N 21/4263;
(Continued)

(56) References Cited

U.S. PATENT DOCUMENTS

| 4,706,121 A | 11/1987 | Young |
| 4,723,246 A | 2/1988 | Weldon, Jr. |

(Continued)

FOREIGN PATENT DOCUMENTS

| CN | 1595975 A | 3/2005 |
| CN | 1615017 A | 5/2005 |

(Continued)

OTHER PUBLICATIONS

Anonymous: "Documentation: Playback—VideoLAN Wiki", Dec. 25, 2010, XP055388595, Retrieved from the Internet: URL:https://wiki.videolan.org/index.php?Title=Documentation:Playback&oldid=18460 [retrieved on Jul. 6, 2017], 3 pages.

(Continued)

*Primary Examiner* — Michael B. Pierorazio
(74) *Attorney, Agent, or Firm* — Kilpatrick Townsend & Stockton, LLP

(57) ABSTRACT

Various arrangements for recording multiple television channels are presented. A plurality of sets of television channels may be identified. An interface may be output for presentation, the interface presenting indications of each of the plurality of sets of television channels and a plurality of input elements associated with the plurality of sets of television channels. User input may be received via one or more of the plurality of input elements indicative of one or more sets of television channels of the plurality of sets of television channels to be recorded. Dates and times at which the one or more sets of television channels are to be recorded may be determined. The one or more sets of television channels may be recorded at the determined dates and the determined times.

20 Claims, 10 Drawing Sheets

Related U.S. Application Data continuation of application No. 14/338,114, filed on Jul. 22, 2014, now Pat. No. 9,361,940, which is a continuation of application No. 13/799,719, filed on Mar. 13, 2013, now Pat. No. 8,819,761.

(60) Provisional application No. 61/611,483, filed on Mar. 15, 2012.

(51) Int. Cl.

| | |
|---|---|
| *H04N 5/91* | (2006.01) |
| *H04N 5/50* | (2006.01) |
| *H04N 9/87* | (2006.01) |
| *H04N 9/79* | (2006.01) |
| *H04N 21/472* | (2011.01) |
| *H04N 21/482* | (2011.01) |
| *H04N 9/797* | (2006.01) |
| *H04N 5/782* | (2006.01) |
| *H04N 21/426* | (2011.01) |
| *H04N 21/433* | (2011.01) |
| *H04N 5/44* | (2011.01) |
| *H04N 5/76* | (2006.01) |
| *G11B 27/28* | (2006.01) |
| *H04N 21/43* | (2011.01) |
| *H04N 21/458* | (2011.01) |
| *H04N 5/775* | (2006.01) |
| *H04N 21/4335* | (2011.01) |
| *H04N 21/475* | (2011.01) |
| *G11B 27/026* | (2006.01) |
| *H04N 21/45* | (2011.01) |
| *H04N 21/242* | (2011.01) |
| *H04N 21/83* | (2011.01) |
| *H04N 21/262* | (2011.01) |
| *H04N 21/84* | (2011.01) |
| *H04N 7/20* | (2006.01) |

(52) U.S. Cl.
CPC ............ *H04N 5/4401* (2013.01); *H04N 5/50* (2013.01); *H04N 5/76* (2013.01); *H04N 5/775* (2013.01); *H04N 5/782* (2013.01); *H04N 5/91* (2013.01); *H04N 9/79* (2013.01); *H04N 9/797* (2013.01); *H04N 9/87* (2013.01); *H04N 21/242* (2013.01); *H04N 21/262* (2013.01); *H04N 21/4263* (2013.01); *H04N 21/4302* (2013.01); *H04N 21/4334* (2013.01); *H04N 21/4335* (2013.01); *H04N 21/4532* (2013.01); *H04N 21/4583* (2013.01); *H04N 21/4755* (2013.01); *H04N 21/47202* (2013.01); *H04N 21/47214* (2013.01); *H04N 21/47217* (2013.01); *H04N 21/482* (2013.01); *H04N 21/4821* (2013.01); *H04N 21/83* (2013.01); *H04N 21/84* (2013.01); *H04N 7/20* (2013.01); *H04N 21/4826* (2013.01)

(58) Field of Classification Search
CPC ......... H04N 21/4755; H04N 21/47214; H04N 21/242; H04N 21/262; H04N 21/83; H04N 21/4532; H04N 21/4334; H04N 21/482; H04N 21/4583; H04N 21/84; H04N 21/47217; H04N 21/4821; H04N 21/4826
USPC ........................................................ 725/39
See application file for complete search history.

(56) References Cited

U.S. PATENT DOCUMENTS

| | | | |
|---|---|---|---|
| 4,802,215 A | 1/1989 | Mason | |
| 5,187,589 A | 2/1993 | Kono et al. | |
| 5,335,277 A | 8/1994 | Harvey et al. | |
| 5,483,277 A * | 1/1996 | Granger | H04N 7/16 348/E7.054 |
| 5,488,658 A | 1/1996 | Hirashima | |
| 5,541,738 A | 7/1996 | Mankovitz | |
| 5,608,652 A | 3/1997 | Astle | |
| 5,642,153 A | 6/1997 | Chaney et al. | |
| 5,682,597 A * | 10/1997 | Ganek | H04N 7/17318 348/E7.071 |
| 5,684,969 A | 11/1997 | Ishida | |
| 5,724,646 A * | 3/1998 | Ganek | H04N 7/17318 348/E7.071 |
| 5,805,763 A | 9/1998 | Lawler et al. | |
| 5,974,218 A | 10/1999 | Nagasaka et al. | |
| 6,049,333 A * | 4/2000 | LaJoie | H04N 5/44543 345/672 |
| 6,263,504 B1 * | 7/2001 | Ebisawa | H04N 7/17318 348/E7.071 |
| 6,351,474 B1 | 2/2002 | Robinett et al. | |
| 6,453,115 B1 * | 9/2002 | Boyle | G11B 20/10 386/346 |
| 6,628,891 B1 | 9/2003 | Vantalon et al. | |
| 6,687,296 B1 | 2/2004 | Sato et al. | |
| 6,701,528 B1 | 3/2004 | Arsenault et al. | |
| 6,728,883 B1 | 4/2004 | Kohashi et al. | |
| 6,766,523 B2 | 7/2004 | Herley | |
| 6,771,703 B1 | 8/2004 | Oguz et al. | |
| 6,798,971 B2 * | 9/2004 | Potrebic | H04N 5/4401 348/E5.105 |
| 6,938,208 B2 | 8/2005 | Reichardt | |
| 7,024,676 B1 | 4/2006 | Klopfenstein | |
| 7,062,048 B1 | 6/2006 | Livaditis et al. | |
| 7,409,140 B2 | 8/2008 | Rodriguez et al. | |
| 7,487,529 B1 | 2/2009 | Orlick | |
| 7,490,169 B1 | 2/2009 | Ogdon et al. | |
| 7,493,312 B2 | 2/2009 | Liu et al. | |
| 7,505,081 B2 * | 3/2009 | Eshleman | H04N 5/775 348/565 |
| 7,533,402 B2 | 5/2009 | Demas et al. | |
| 7,542,656 B2 | 6/2009 | Cho et al. | |
| 7,577,751 B2 | 8/2009 | Vinson et al. | |
| 7,590,993 B1 | 9/2009 | Hendricks et al. | |
| 7,684,672 B2 | 3/2010 | Matoba | |
| 7,715,552 B2 | 5/2010 | Pinder et al. | |
| 7,730,517 B1 | 6/2010 | Rey et al. | |
| 7,739,711 B2 | 6/2010 | Finseth et al. | |
| 7,760,986 B2 | 7/2010 | Beuque | |
| 7,804,861 B2 | 9/2010 | Kim | |
| 7,848,618 B2 | 12/2010 | Potrebic et al. | |
| 7,856,557 B2 | 12/2010 | Beuque | |
| 7,925,141 B2 | 4/2011 | Geer et al. | |
| 7,926,078 B2 | 4/2011 | Arsenault et al. | |
| 7,929,697 B2 | 4/2011 | McNeely et al. | |
| 7,962,937 B2 | 6/2011 | Cho et al. | |
| 8,006,268 B2 * | 8/2011 | Sloo | G06F 17/30796 707/706 |
| 8,201,194 B2 * | 6/2012 | Wijnands | H04H 60/46 370/352 |
| 8,321,466 B2 | 11/2012 | Black et al. | |
| 8,364,671 B1 | 1/2013 | Sinton et al. | |
| 8,437,622 B2 | 5/2013 | Casagrande | |
| 8,447,170 B2 | 5/2013 | Casagrande | |
| 8,566,873 B2 | 10/2013 | Sie et al. | |
| 8,584,167 B2 | 11/2013 | Vanduyn | |
| 8,606,088 B2 | 12/2013 | Kummer et al. | |
| 8,627,349 B2 | 1/2014 | Kirby et al. | |
| 8,660,412 B2 | 2/2014 | Kummer et al. | |
| 8,763,027 B2 | 6/2014 | Martch | |
| 8,774,608 B2 | 7/2014 | Kummer et al. | |
| 8,819,722 B2 | 8/2014 | Kummer et al. | |
| 8,819,761 B2 | 8/2014 | Minnick | |
| 8,850,476 B2 | 9/2014 | VanDuyn et al. | |

(56) References Cited

U.S. PATENT DOCUMENTS

| | | | |
|---|---|---|---|
| 8,867,893 B2 | 10/2014 | Kirby | |
| 8,959,544 B2 | 2/2015 | Kummer et al. | |
| 8,959,566 B2 | 2/2015 | Kummer | |
| 8,989,562 B2 | 3/2015 | Kummer et al. | |
| 8,997,153 B2 | 3/2015 | Templeman | |
| 9,031,385 B2 | 5/2015 | Casagrande et al. | |
| 9,043,843 B2 | 5/2015 | Templeman et al. | |
| 9,055,274 B2 | 6/2015 | Casagrande | |
| 9,088,763 B2 | 7/2015 | Martch et al. | |
| 9,113,222 B2 | 8/2015 | VanDuyn | |
| 9,177,605 B2 | 11/2015 | Minnick et al. | |
| 9,177,606 B2 | 11/2015 | Kirby | |
| 9,185,331 B2 | 11/2015 | Martch et al. | |
| 9,191,694 B2 | 11/2015 | Casagrande | |
| 9,202,524 B2 | 12/2015 | Martch et al. | |
| 9,264,779 B2 | 2/2016 | Kirby et al. | |
| 9,269,397 B2 | 2/2016 | Casagrande et al. | |
| 9,349,412 B2 | 5/2016 | Templeman | |
| 9,350,937 B2 | 5/2016 | Kummer et al. | |
| 9,357,159 B2 | 5/2016 | Martch et al. | |
| 9,361,940 B2 | 6/2016 | Minnick | |
| 9,412,413 B2 | 8/2016 | Martch | |
| 9,489,981 B2 | 11/2016 | Templeman et al. | |
| 9,489,982 B2 | 11/2016 | Casagrande et al. | |
| 9,521,440 B2 | 12/2016 | Kummer et al. | |
| 9,549,213 B2 | 1/2017 | Templeman et al. | |
| 9,621,946 B2 | 4/2017 | Kennedy | |
| 9,628,838 B2 | 4/2017 | Kummer et al. | |
| 9,635,436 B2 | 4/2017 | Casagrande | |
| 9,756,378 B2 | 9/2017 | Hardy | |
| 9,781,464 B2 | 10/2017 | Templeman | |
| 9,854,291 B2 | 12/2017 | Minnick | |
| 9,894,406 B2 | 2/2018 | Martch et al. | |
| 9,918,116 B2 | 3/2018 | Robinson | |
| 2001/0028782 A1* | 10/2001 | Ohno | H04N 5/4401 386/239 |
| 2001/0033736 A1 | 10/2001 | Yap et al. | |
| 2001/0034787 A1 | 10/2001 | Takao et al. | |
| 2001/0049820 A1 | 12/2001 | Barton | |
| 2002/0044658 A1 | 4/2002 | Wasilewski et al. | |
| 2002/0054752 A1 | 5/2002 | Wood et al. | |
| 2002/0055343 A1 | 5/2002 | Stetzler et al. | |
| 2002/0087979 A1 | 7/2002 | Dudkiewicz et al. | |
| 2002/0087983 A1 | 7/2002 | Son et al. | |
| 2002/0092021 A1 | 7/2002 | Yap et al. | |
| 2002/0095510 A1 | 7/2002 | Sie et al. | |
| 2002/0097340 A1 | 7/2002 | Takagi et al. | |
| 2002/0116705 A1 | 8/2002 | Perlman | |
| 2002/0120925 A1 | 8/2002 | Logan | |
| 2002/0126221 A1 | 9/2002 | Link | |
| 2002/0141431 A1 | 10/2002 | Tripathy | |
| 2002/0144259 A1 | 10/2002 | Gutta et al. | |
| 2002/0144266 A1 | 10/2002 | Goldman et al. | |
| 2002/0152299 A1 | 10/2002 | Traversat et al. | |
| 2002/0164147 A1 | 11/2002 | Suda | |
| 2002/0168178 A1* | 11/2002 | Rodriguez | H04N 5/76 386/293 |
| 2002/0174430 A1* | 11/2002 | Ellis | G11B 27/005 725/46 |
| 2002/0184638 A1* | 12/2002 | Agnihotri | G11B 27/36 725/89 |
| 2002/0188943 A1 | 12/2002 | Freeman et al. | |
| 2003/0005454 A1* | 1/2003 | Rodriguez | G06Q 30/0601 725/89 |
| 2003/0026423 A1 | 2/2003 | Unger et al. | |
| 2003/0078930 A1 | 4/2003 | Surcouf et al. | |
| 2003/0097659 A1 | 5/2003 | Goldman | |
| 2003/0110514 A1* | 6/2003 | West | H04N 5/76 725/134 |
| 2003/0149988 A1* | 8/2003 | Ellis | H04N 5/44543 725/87 |
| 2003/0152360 A1 | 8/2003 | Mukai et al. | |
| 2003/0156826 A1 | 8/2003 | Sonoda et al. | |
| 2003/0177492 A1* | 9/2003 | Kanou | H04N 5/44543 725/39 |
| 2003/0177495 A1 | 9/2003 | Needham et al. | |
| 2003/0200548 A1 | 10/2003 | Baran et al. | |
| 2003/0208763 A1 | 11/2003 | McElhatten et al. | |
| 2003/0208767 A1* | 11/2003 | Williamson | G06F 3/0482 725/93 |
| 2003/0226150 A1* | 12/2003 | Berberet | H04N 7/17318 725/94 |
| 2004/0001087 A1* | 1/2004 | Warmus | G06F 17/30699 715/745 |
| 2004/0003118 A1 | 1/2004 | Brown et al. | |
| 2004/0015992 A1 | 1/2004 | Hasegawa et al. | |
| 2004/0015999 A1 | 1/2004 | Carlucci et al. | |
| 2004/0078829 A1* | 4/2004 | Patel | G06F 3/0482 725/135 |
| 2004/0080672 A1 | 4/2004 | Kessler et al. | |
| 2004/0103428 A1 | 5/2004 | Seok et al. | |
| 2004/0128682 A1 | 7/2004 | Liga et al. | |
| 2004/0133923 A1* | 7/2004 | Watson | G06Q 30/06 725/134 |
| 2004/0148501 A1 | 7/2004 | Livaditis et al. | |
| 2004/0162871 A1 | 8/2004 | Pabla et al. | |
| 2004/0218905 A1 | 11/2004 | Green et al. | |
| 2004/0242150 A1 | 12/2004 | Wright et al. | |
| 2004/0268387 A1 | 12/2004 | Wendling | |
| 2005/0002640 A1 | 1/2005 | Putterman | |
| 2005/0034171 A1* | 2/2005 | Benya | G06F 3/0482 725/143 |
| 2005/0071877 A1 | 3/2005 | Navarro | |
| 2005/0083865 A1 | 4/2005 | Ashley et al. | |
| 2005/0120049 A1 | 6/2005 | Kanegae et al. | |
| 2005/0125683 A1 | 6/2005 | Matsuyama et al. | |
| 2005/0144646 A1 | 6/2005 | Lecrom et al. | |
| 2005/0147383 A1 | 7/2005 | Ihara | |
| 2005/0180568 A1 | 8/2005 | Krause | |
| 2005/0229213 A1 | 10/2005 | Ellis et al. | |
| 2005/0237435 A1 | 10/2005 | Potrebic et al. | |
| 2005/0267656 A1 | 12/2005 | Dabrowski | |
| 2005/0271365 A1 | 12/2005 | Hisatomi | |
| 2005/0273819 A1 | 12/2005 | Knudson et al. | |
| 2005/0281531 A1 | 12/2005 | Unmehopa | |
| 2006/0010464 A1 | 1/2006 | Azami | |
| 2006/0020962 A1 | 1/2006 | Stark et al. | |
| 2006/0056800 A1 | 3/2006 | Shimagami et al. | |
| 2006/0075434 A1 | 4/2006 | Chaney et al. | |
| 2006/0078055 A1 | 4/2006 | Kanazawa | |
| 2006/0080716 A1 | 4/2006 | Nishikawa et al. | |
| 2006/0085828 A1 | 4/2006 | Dureau et al. | |
| 2006/0120523 A1 | 6/2006 | Kurotaki | |
| 2006/0206819 A1 | 9/2006 | Tsuji et al. | |
| 2006/0212900 A1 | 9/2006 | Ismail et al. | |
| 2006/0215993 A1 | 9/2006 | Yamada | |
| 2006/0257099 A1 | 11/2006 | Potrebic et al. | |
| 2006/0274208 A1 | 12/2006 | Pedlow, Jr. | |
| 2007/0016546 A1 | 1/2007 | De Vorchik et al. | |
| 2007/0019930 A1 | 1/2007 | Kim | |
| 2007/0039032 A1 | 2/2007 | Goldey et al. | |
| 2007/0061378 A1 | 3/2007 | Lee et al. | |
| 2007/0154163 A1 | 7/2007 | Cordray | |
| 2007/0157248 A1* | 7/2007 | Ellis | H04N 5/445 725/47 |
| 2007/0157253 A1 | 7/2007 | Ellis et al. | |
| 2007/0165855 A1 | 7/2007 | Inui | |
| 2007/0183745 A1 | 8/2007 | White | |
| 2007/0192586 A1 | 8/2007 | McNeely | |
| 2007/0204288 A1 | 8/2007 | Candelore | |
| 2007/0234395 A1 | 10/2007 | Dureau et al. | |
| 2007/0250856 A1 | 10/2007 | Leavens et al. | |
| 2007/0258596 A1 | 11/2007 | Kahn et al. | |
| 2007/0299976 A1 | 12/2007 | Zafar et al. | |
| 2007/0300250 A1 | 12/2007 | Smith et al. | |
| 2008/0022347 A1* | 1/2008 | Cohen | H04N 7/17336 725/134 |
| 2008/0044158 A1 | 2/2008 | Kido | |
| 2008/0046929 A1 | 2/2008 | Cho et al. | |
| 2008/0052743 A1 | 2/2008 | Moore | |
| 2008/0074547 A1 | 3/2008 | Ida | |

(56) References Cited

U.S. PATENT DOCUMENTS

| | | | |
|---|---|---|---|
| 2008/0092164 A1 | 4/2008 | Agarwal et al. | |
| 2008/0092181 A1* | 4/2008 | Britt | H04N 7/1675 725/87 |
| 2008/0101760 A1 | 5/2008 | Waller | |
| 2008/0104534 A1 | 5/2008 | Park et al. | |
| 2008/0127253 A1* | 5/2008 | Zhang | H04N 21/478 725/35 |
| 2008/0137850 A1 | 6/2008 | Mamidwar | |
| 2008/0141322 A1 | 6/2008 | Jang et al. | |
| 2008/0144747 A1 | 6/2008 | Tomizawa | |
| 2008/0152039 A1 | 6/2008 | Shah et al. | |
| 2008/0184327 A1 | 7/2008 | Ellis et al. | |
| 2008/0216119 A1 | 9/2008 | Pfeffer et al. | |
| 2008/0216136 A1 | 9/2008 | Pfeffer et al. | |
| 2008/0222678 A1 | 9/2008 | Burke et al. | |
| 2008/0222681 A1* | 9/2008 | Kwon | H04N 5/775 725/46 |
| 2008/0271077 A1 | 10/2008 | Kim et al. | |
| 2008/0273698 A1 | 11/2008 | Manders et al. | |
| 2008/0273856 A1 | 11/2008 | Bumgardner | |
| 2008/0276284 A1 | 11/2008 | Bumgardner et al. | |
| 2008/0288461 A1 | 11/2008 | Glennon et al. | |
| 2008/0291206 A1 | 11/2008 | Uchimura et al. | |
| 2008/0298585 A1 | 12/2008 | Maillard et al. | |
| 2008/0301740 A1 | 12/2008 | Tsutsui | |
| 2008/0307217 A1 | 12/2008 | Yukimatsu et al. | |
| 2009/0025027 A1* | 1/2009 | Craner | H04H 20/103 725/32 |
| 2009/0051579 A1 | 2/2009 | Inaba et al. | |
| 2009/0067621 A9 | 3/2009 | Wajs | |
| 2009/0080930 A1 | 3/2009 | Shinotsuka et al. | |
| 2009/0100466 A1 | 4/2009 | Migos | |
| 2009/0110367 A1 | 4/2009 | Fukui | |
| 2009/0129741 A1 | 5/2009 | Kim | |
| 2009/0129749 A1 | 5/2009 | Oyamatsu et al. | |
| 2009/0136206 A1 | 5/2009 | Aisu | |
| 2009/0150941 A1* | 6/2009 | Riedl | H04N 7/173 725/61 |
| 2009/0158370 A1 | 6/2009 | Li et al. | |
| 2009/0165057 A1 | 6/2009 | Miller et al. | |
| 2009/0172722 A1 | 7/2009 | Kahn et al. | |
| 2009/0178098 A1 | 7/2009 | Westbrook et al. | |
| 2009/0210912 A1 | 8/2009 | Cholas et al. | |
| 2009/0235298 A1 | 9/2009 | Carlberg et al. | |
| 2009/0254962 A1 | 10/2009 | Hendricks et al. | |
| 2009/0260038 A1 | 10/2009 | Acton et al. | |
| 2009/0320073 A1 | 12/2009 | Reisman | |
| 2009/0320084 A1* | 12/2009 | Azam | H04N 7/17318 725/120 |
| 2009/0324203 A1* | 12/2009 | Wiklof | H04N 1/00933 386/291 |
| 2010/0020794 A1 | 1/2010 | Cholas et al. | |
| 2010/0037282 A1 | 2/2010 | Iwata et al. | |
| 2010/0043022 A1* | 2/2010 | Kaftan | G06Q 30/02 725/34 |
| 2010/0050225 A1 | 2/2010 | Bennett | |
| 2010/0086277 A1 | 4/2010 | Craner | |
| 2010/0095323 A1* | 4/2010 | Williamson | H04H 20/30 725/32 |
| 2010/0100899 A1 | 4/2010 | Bradbury et al. | |
| 2010/0115121 A1 | 5/2010 | Roos et al. | |
| 2010/0135639 A1 | 6/2010 | Ellis et al. | |
| 2010/0138865 A1 | 6/2010 | Rai et al. | |
| 2010/0146581 A1 | 6/2010 | Erk | |
| 2010/0158479 A1 | 6/2010 | Craner | |
| 2010/0158480 A1 | 6/2010 | Jung et al. | |
| 2010/0162285 A1 | 6/2010 | Cohen et al. | |
| 2010/0169926 A1 | 7/2010 | Westberg et al. | |
| 2010/0195827 A1 | 8/2010 | Lee et al. | |
| 2010/0217613 A1* | 8/2010 | Kelly | G06Q 30/02 705/1.1 |
| 2010/0218208 A1* | 8/2010 | Holden | G11B 27/00 725/32 |
| 2010/0232604 A1 | 9/2010 | Eklund, II | |
| 2010/0235862 A1 | 9/2010 | Adachi | |
| 2010/0239228 A1 | 9/2010 | Sano | |
| 2010/0242079 A1* | 9/2010 | Riedl | H04N 7/17318 725/115 |
| 2010/0246582 A1* | 9/2010 | Salinger | H04L 12/2801 370/392 |
| 2010/0247067 A1 | 9/2010 | Gratton | |
| 2010/0251304 A1* | 9/2010 | Donoghue | H04N 5/44543 725/46 |
| 2010/0251305 A1* | 9/2010 | Kimble | H04N 7/17318 725/46 |
| 2010/0254386 A1* | 10/2010 | Salinger | H04L 12/2801 370/392 |
| 2010/0265391 A1 | 10/2010 | Muramatsu et al. | |
| 2010/0272419 A1 | 10/2010 | Wang et al. | |
| 2010/0284537 A1 | 11/2010 | Inbar | |
| 2010/0293583 A1* | 11/2010 | Loebig | G06Q 30/0283 725/109 |
| 2010/0299528 A1 | 11/2010 | Le Floch | |
| 2010/0306401 A1* | 12/2010 | Gilson | H04N 5/765 709/231 |
| 2010/0313222 A1 | 12/2010 | Lee et al. | |
| 2010/0319037 A1 | 12/2010 | Kim | |
| 2010/0329645 A1 | 12/2010 | Sakamoto | |
| 2011/0001879 A1 | 1/2011 | Goldey et al. | |
| 2011/0007218 A1 | 1/2011 | Moran et al. | |
| 2011/0008024 A1 | 1/2011 | Sasaki et al. | |
| 2011/0043652 A1 | 2/2011 | King et al. | |
| 2011/0078750 A1 | 3/2011 | Tam et al. | |
| 2011/0080529 A1 | 4/2011 | Wong | |
| 2011/0099364 A1 | 4/2011 | Robyr et al. | |
| 2011/0106744 A1 | 5/2011 | Becker et al. | |
| 2011/0131413 A1 | 6/2011 | Moon et al. | |
| 2011/0138169 A1 | 6/2011 | Michel | |
| 2011/0138424 A1 | 6/2011 | Vlot | |
| 2011/0145854 A1 | 6/2011 | Bacon et al. | |
| 2011/0150429 A1 | 6/2011 | Kaneko | |
| 2011/0162011 A1 | 6/2011 | Hassell et al. | |
| 2011/0179453 A1 | 7/2011 | Poniatowski | |
| 2011/0225616 A1 | 9/2011 | Ellis | |
| 2011/0235701 A1 | 9/2011 | Kim | |
| 2011/0239249 A1 | 9/2011 | Munson et al. | |
| 2011/0255002 A1 | 10/2011 | Witheiler | |
| 2011/0286719 A1 | 11/2011 | Woods | |
| 2011/0311045 A1 | 12/2011 | Candelore et al. | |
| 2012/0183276 A1 | 7/2012 | Quan et al. | |
| 2012/0195433 A1 | 8/2012 | Eppolito et al. | |
| 2012/0198317 A1 | 8/2012 | Eppolito et al. | |
| 2012/0198501 A1* | 8/2012 | Ruan | H04H 20/30 725/62 |
| 2012/0236933 A1 | 9/2012 | Saitoh | |
| 2012/0278837 A1 | 11/2012 | Curtis et al. | |
| 2012/0296745 A1 | 11/2012 | Harper et al. | |
| 2012/0301104 A1 | 11/2012 | Dove | |
| 2012/0311534 A1 | 12/2012 | Fox et al. | |
| 2012/0311634 A1 | 12/2012 | Van Duyn | |
| 2012/0331494 A1 | 12/2012 | Pontual et al. | |
| 2012/0331505 A1 | 12/2012 | Chun et al. | |
| 2013/0014146 A1 | 1/2013 | Bhatia et al. | |
| 2013/0014159 A1 | 1/2013 | Wiser et al. | |
| 2013/0051555 A1 | 2/2013 | Martch et al. | |
| 2013/0051758 A1 | 2/2013 | Kummer et al. | |
| 2013/0051764 A1 | 2/2013 | Casagrande | |
| 2013/0051766 A1 | 2/2013 | Martch et al. | |
| 2013/0051773 A1 | 2/2013 | Casagrande | |
| 2013/0054579 A1 | 2/2013 | Kennedy | |
| 2013/0055304 A1 | 2/2013 | Kirby et al. | |
| 2013/0055305 A1 | 2/2013 | Martch et al. | |
| 2013/0055310 A1 | 2/2013 | VanDuyn et al. | |
| 2013/0055311 A1 | 2/2013 | Kirby et al. | |
| 2013/0055314 A1 | 2/2013 | Martch | |
| 2013/0055333 A1 | 2/2013 | Kummer | |
| 2013/0081098 A1 | 3/2013 | Klughart | |
| 2013/0216208 A1 | 8/2013 | Kummer et al. | |
| 2013/0223814 A1 | 8/2013 | Casagrande | |
| 2013/0243397 A1 | 9/2013 | Minnick et al. | |
| 2013/0243398 A1 | 9/2013 | Templeman et al. | |
| 2013/0243399 A1 | 9/2013 | Casagrande et al. | |

(56) References Cited

U.S. PATENT DOCUMENTS

| | | |
|---|---|---|
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | VanDuyn |
| 2014/0050462 A1 | 2/2014 | Kummer et al. |
| 2014/0115636 A1 | 4/2014 | Stuckman |
| 2014/0126889 A1 | 5/2014 | Kummer et al. |
| 2014/0130094 A1 | 5/2014 | Kirby et al. |
| 2014/0147102 A1 | 5/2014 | Shartzer et al. |
| 2014/0201767 A1 | 7/2014 | Seiden et al. |
| 2014/0341377 A1 | 11/2014 | Kummer et al. |
| 2014/0344858 A1 | 11/2014 | Minnick |
| 2014/0363139 A1 | 12/2014 | Kirby |
| 2014/0376884 A1 | 12/2014 | Lovell |
| 2015/0040166 A1 | 2/2015 | Tamura et al. |
| 2015/0095948 A1 | 4/2015 | Kummer et al. |
| 2015/0104146 A1 | 4/2015 | Higuchi et al. |
| 2015/0121430 A1 | 4/2015 | Templeman |
| 2015/0208119 A1 | 7/2015 | Casagrande et al. |
| 2015/0208125 A1 | 7/2015 | Robinson |
| 2015/0228305 A1 | 8/2015 | Templeman et al. |
| 2015/0245089 A1 | 8/2015 | Protrebic |
| 2015/0245113 A1 | 8/2015 | Casagrande |
| 2015/0319400 A1 | 11/2015 | Golyshko |
| 2016/0073144 A1 | 3/2016 | Robinson |
| 2016/0080800 A1 | 3/2016 | Casagrande |
| 2016/0105711 A1 | 4/2016 | Martch et al. |
| 2016/0134926 A1 | 5/2016 | Casagrande et al. |
| 2016/0198215 A1 | 7/2016 | Hardy |
| 2016/0234543 A1 | 8/2016 | Templeman |
| 2016/0249089 A1* | 8/2016 | Minnick ............... H04N 5/782 |
| 2016/0323632 A1 | 11/2016 | Martch et al. |

FOREIGN PATENT DOCUMENTS

| | | |
|---|---|---|
| CN | 1926793 A | 3/2007 |
| CN | 101174946 A | 5/2008 |
| CN | 101202600 A | 6/2008 |
| CN | 101310532 A | 11/2008 |
| CN | 101 404 780 A | 4/2009 |
| CN | 101978690 A | 2/2011 |
| EP | 0 903 743 A | 3/1999 |
| EP | 0 973 333 A | 1/2000 |
| EP | 1 001 631 A1 | 5/2000 |
| EP | 1 168 347 A | 2/2002 |
| EP | 1372339 A2 | 12/2003 |
| EP | 1 447 983 A1 | 8/2004 |
| EP | 1 667 452 B1 | 7/2006 |
| EP | 1 742 467 A2 | 1/2007 |
| EP | 2 018 059 A1 | 1/2009 |
| EP | 2 317 767 A1 | 5/2011 |
| EP | 2 357 563 A1 | 8/2011 |
| EP | 2 541 929 A1 | 1/2013 |
| EP | 2 826 197 A1 | 1/2015 |
| EP | 2 826 238 A1 | 1/2015 |
| GB | 2 459 705 A | 11/2009 |
| IN | 9740/CHENP/2013 A | 9/2014 |
| IN | 7408/CHENP/2014 A | 1/2016 |
| IN | 9493/CHENP/2013 A | 6/2016 |
| JP | 2007 116525 A | 5/2007 |
| JP | 2010165058 A | 7/2010 |
| WO | 98/12872 A1 | 3/1998 |
| WO | 01/24532 A1 | 4/2001 |
| WO | 02/41625 A1 | 5/2002 |
| WO | 2004/057610 A1 | 8/2004 |
| WO | 2007/047410 A2 | 4/2007 |
| WO | 2008/010118 A1 | 1/2008 |
| WO | 2008/010689 A1 | 1/2008 |
| WO | 2008/060486 A2 | 5/2008 |
| WO | 2011/081729 A1 | 7/2011 |
| WO | 2011/027236 A1 | 10/2011 |
| WO | 2012/003693 A1 | 1/2012 |
| WO | 2013/028824 A2 | 2/2013 |
| WO | 2013/028829 A2 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |
| WO | 2016/066443 A1 | 5/2016 |
| WO | 2016/111817 A1 | 7/2016 |

OTHER PUBLICATIONS

U.S. Appl. No. 14/880,934, filed Oct. 12, 2015, Non-Final Rejection dated Mar. 7, 2018, all pages.
U.S. Appl. No. 14/880,934, filed Oct. 12, 2015, Notice of Allowance dated Jul. 2, 2018, all pages.
U.S. Appl. No. 15/141,304, Non-Final Office Action dated Apr. 6, 2018, all pages.
Decision to Grant from the State Intellectual Property Office (SIPO) for CN 201280031150.8 dated Apr. 18, 2018, all pages.
Office Action for Canadian Appln No. 2,838,750 dated Apr. 16, 2018, all pages.
Office Action for EP 128254745 dated Aug. 4, 2017, all pages.
Wikipedia: "MPEG-2 Transmission", Internet Citation, Jan. 31, 2001, pp. 1-9, XP002715999, Retrieved from the Internet: URL: http://www.erg.abdn.ac.uk/future-net/digital-video/mpeg2-trans.html [retrieved on Nov. 7, 2013].
International Search Report and Written Opinion of PCT/US2012/51992 dated Nov. 2, 2012, 15 pages.
International Search Report and Written Opinion of PCT/US2012/51987 dated Oct. 23, 2012, 20 pages.
International Search Report and Written Opinion of PCT/US2012/051984 dated Nov. 5, 2012, 13 pages.
International Search Report and Written Opinion of PCT/US2012/52002 dated Oct. 16, 2012, 17 pages.
International Search Report and Written Opinion of PCT/US2013/031432 dated May 28, 2013, 10 pages.
International Preliminary Report on Patentability for PCT/US2013/031432 dated Sep. 16, 2014, 9 pages.
International Search Report and Written Opinion of PCT/US2013/031445 dated May 24, 2013, 11 pages.
International Preliminary Report on Patentability for PCT/US2013/031445 dated Sep. 16, 2014, 10 pages.
International Preliminary Report on Patentability for PCT/US2012/052002 dated Apr. 17, 2014, 10 pages.
International Search Report and Written Opinion of PCT/US2012/51964 dated Nov. 2, 2012, 13 pages.
International Search Report and Written Opinion of PCT/US2015/065934 dated Apr. 8, 2016, all pages.
International Prelminary Report on Patentability for PCT/US2015/065934 dated Jul. 11, 2017, all pages.
International Search Report and Written Opinion of PCT/EP2015/073937 dated Apr. 15, 2016, all pages.
International Search Report and Written Opinion of PCT/US2012/052011 dated Dec. 17, 2012, 44 pages.
International Preliminary Report on Patentability, PCT/US2012/052011 dated Mar. 6, 2014, 6 pages.
International Preliminary Report on Patentability, PCT/US2012/051984 dated Mar. 6, 2014, 8 pages.
International Preliminary Report on Patentability, PCT/US2012/051964 dated Apr. 10, 2014, 7 pages.
International Preliminary Report on Patentability, PCT/US2012/051992 dated Apr. 3, 2014, 7 pages.
International Preliminary Report on Patentability, PCT/US2012/051987 dated Mar. 6, 2014, 7 pages.

(56) References Cited

OTHER PUBLICATIONS

Publication of Brazil appln No. BR 11 2013 031100-2 on Jun. 6, 2017, 1 page.
Author Unknown, "Move Networks is Delivering the Next Generation of Television," Move Networks, 2010, obtained online at http://movenetworks.com/, 2 pages.
Design and implementation of a multi-stream cableCARD with a high-speed DVB-common descrambler; Joonyoung Jung, Ohyung Kwon, Sooin Lee; In proceeding of: Proceedings of the 14th ACM International Conference on Multimedia, Santa Barbara, CA, USA, Oct. 23-27, 2006, 4 pages.
Anonymous: "The Angry Technician's Guide to streaming Freeview via VLC, you Idiots / The Angry Technician", Jun. 24, 2010, XP055388589, Retrieved from the internet: URL: https://angrytechnician.wordpress.com/2010/06/24/the-angry-techniciansguide-to-streaming-freeview-via-vlc-you-idiots/ [retrieved on Jul. 6, 2017], 14 pages.
Anonymous: "How to Watch DVB-T With VLC Media Player", Jan. 25, 2009, XP055388602, Retrieved from the Internet: URL: http://www.izitips.com/software/how-to-watch-dvb-t-with-vlc-media-player/ [retrieved on Jul. 6, 2017], 3 pages.
Anonymous: "News—VideoLAN", Jul. 15, 2011, XP055388604, Retreived from the Internet: URL: http://www.videolan.org/news.html#news-2011-07-15 [retrieved on Jul. 6, 2017], 69 pages.
Office Action received Jul. 18, 2017 for EP 12825147.7, 7 pages.
Office Action for EP 13 192 169.4 dated Mar. 29, 2016, all pages.
U.S. Appl. No. 13/786,915, filed Mar. 6, 2013, Non Final Rejection dated Oct. 15, 2015, 59 pages.
U.S. Appl. No. 13/786,915, filed Mar. 6, 2013, Final Rejection dated May 12, 2016, 27 pages.
U.S. Appl. No. 13/786,915, filed Mar. 6, 2013, Notice of Allowance dated Jul. 19, 2016, all pages.
U.S. Appl. No. 14/757,606, filed Dec. 23, 2015, Non Final Rejection dated Mar. 24, 2016, 33 pages.
U.S. Appl. No. 14/757,606, filed Dec. 23, 2015, Notice of Allowance dated Jul. 18, 2016, all pages.
U.S. Appl. No. 14/340,190, filed Jul. 24, 2014, Non-Final Rejection dated Aug. 31, 2015, 74 pages.
U.S. Appl. No. 14/340,190, filed Jul. 24, 2014, Final Rejection dated Feb. 19, 2016, 54 pages.
U.S. Appl. No. 14/340,190, filed Jul. 24, 2014, Notice of Allowance dated Aug. 22, 2016, all pages.
U.S. Appl. No. 14/154,887, filed Jan. 14, 2014 Non-Final Rejection dated Jul. 17, 2015, 33 pages.
U.S. Appl. No. 14/154,887, filed Jan. 14, 2014 Notice of Allowance dated Jan. 21, 2016, 26 pages.
U.S. Appl. No. 14/467,959, filed Aug. 25, 2014 Notice of Allowance dated Jun. 22, 2016, 36 pages.
U.S. Appl. No. 13/888,012, filed May 6, 2013 Non-Final Rejection dated Apr. 6, 2015, 36 pages.
U.S. Appl. No. 13/888,012, filed May 6, 2013 Notice of Allowance dated Jul. 14, 2015, 18 pages.
U.S. Appl. No. 13/856,752, filed Apr. 4, 2013 Non Final Office Action dated Nov. 5, 2014, 34 pages.
U.S. Appl. No. 13/856,752, filed Apr. 4, 2013 Notice of Allowance dated Feb. 10, 2015, 20 pages.
U.S. Appl. No. 13/757,168, filed Feb. 1, 2013 Notice of Allowance dated Oct. 14, 2014, 28 pages.
U.S. Appl. No. 13/757,168, filed Feb. 1, 2013, Non Final Office Action dated Jun. 4, 2014, 23 pages.
U.S. Appl. No. 13/799,604, filed Mar. 13, 2013, Notice of Allowance dated Jul. 24, 2015, 34 pages.
U.S. Appl. No. 13/799,604, filed Mar. 13, 2013, Notice of Allowance dated May 29, 2015, 46 pages.
U.S. Appl. No. 13/799,604, filed Mar. 13, 2013, Final Office Action dated Jan. 14, 2015, 36 pages.
U.S. Appl. No. 13/799,604, filed Mar. 13, 2013, Non Final Office Action dated Jun. 6, 2014, 24 pages.
U.S. Appl. No. 13/149,852, filed May 31, 2011, Non-Final Office Action dated Dec. 12, 2012, 9 pages.
U.S. Appl. No. 13/149,852, filed May 31, 2011, Final Office Action dated Mar. 26, 2013, 13 pages.
U.S. Appl. No. 13/149,852, filed May 31, 2011, Notice of Allowance dated Jul. 11, 2013, 13 pages.
U.S. Appl. No. 13/286,157, filed Oct. 31, 2011, Non-Final Office Action dated Jan. 17, 2013, 20 pages.
U.S. Appl. No. 13/286,157, filed Oct. 31, 2011, Non-Final Office Action dated Jul. 25, 2013, 49 pages.
U.S. Appl. No. 13/286,157, filed Oct. 31, 2011, Notice of Allowance dated Feb. 3, 2014, 81 pages.
U.S. Appl. No. 13/215,702, filed Aug. 23, 2011, Notice of Allowance dated Feb. 11, 2013, 13 pages.
U.S. Appl. No. 13/288,002, filed Nov. 2, 2011, Non-final Office Action dated Sep. 26, 2013, 15 pages.
U.S. Appl. No. 13/288,002, filed Nov. 2, 2011, Final Office Action dated Mar. 27, 2014, 20 pages.
U.S. Appl. No. 13/288,002, filed Nov. 2, 2011 Non Final Rejection dated Jul. 28, 2015, 29 pages.
U.S. Appl. No. 13/288,002, filed Nov. 2, 2011 Final Rejection dated Jan. 13, 2016, 22 pages.
U.S. Appl. No. 13/302,852, filed Nov. 22, 2011 Non-Final Rejection dated May 23, 2013, 19 pages.
U.S. Appl. No. 13/302,852, filed Nov. 22, 2011, Notice of Allowance dated Jun. 19, 2015, 26 pages.
U.S. Appl. No. 13/302,852, filed Nov. 22, 2011, Final Rejection dated Dec. 9, 2013, 23 pages.
U.S. Appl. No. 13/302,852, filed Nov. 22, 2011, Non-Final Rejection dated Sep. 2, 2014, 28 pages.
U.S. Appl. No. 13/302,852, filed Nov. 22, 2011, Final Rejection dated Mar. 30, 2015, 29 pages.
The Notice of Allowance by the Mexican Institute of Industrial Property for Mexican Patent Application No. MX/a/2013/014907 dated Feb. 20, 2015 is not translated into English, 1 page.
U.S. Appl. No. 13/324,831, filed Dec. 13, 2011, Non-Final Office Action dated Feb. 28, 2013, 23 pages.
U.S. Appl. No. 13/324,831, filed Dec. 13, 2011, Notice of Allowance dated Sep. 4, 2013, 22 pages.
U.S. Appl. No. 13/292,047, filed Nov. 8, 2011, Non-Final Office Action dated Jan. 18, 2013, 17 pages.
U.S. Appl. No. 13/292,047, filed Nov. 8, 2011, Final Office Action dated Aug. 19, 2013, 17 pages.
U.S. Appl. No. 13/292,047, filed Nov. 8, 2011 Final Office Action dated Jan. 13, 2015, 22 pages.
U.S. Appl. No. 13/292,047, filed Nov. 8, 2011 Non-Final Office Action dated Jul. 7, 2015, 28 pages.
U.S. Appl. No. 13/292,047, filed Nov. 8, 2011 Notice of Allowance dated Jan. 29, 2016, 45 pages.
U.S. Appl. No. 13/614,899, filed Sep. 13, 2012, Non-Final Office Action dated Feb. 5, 2013, 17 pages.
U.S. Appl. No. 13/614,899, filed Sep. 13, 2012, Non-Final Office Action dated May 20, 2014, 25 pages.
U.S. Appl. No. 13/614,899, filed Sep. 13, 2012, Non-Final Office Action dated Sep. 17, 2013, 17 pages.
U.S. Appl. No. 13/614,899, filed Sep. 13, 2012, Final Office Action dated Mar. 17, 2014, 41 pages.
U.S. Appl. No. 13/614,899, filed Sep. 13, 2012, Notice of Allowance dated Mar. 13, 2015, 35 pages.
U.S. Appl. No. 13/291,014, filed Nov. 7, 2011, Non-Final Office Action dated Mar. 29, 2013, 21 pages.
U.S. Appl. No. 13/291,014, filed Nov. 7, 2011, Notice of Allowance dated Aug. 7, 2013, 16 pages.
U.S. Appl. No. 13/215,598, filed Aug. 23, 2011, Non-Final Office Action dated Jun. 20, 2013, 15 pages.
U.S. Appl. No. 13/215,598, filed Aug. 23, 2011, Final Office Action dated Nov. 21, 2013, 23 pages.
U.S. Appl. No. 13/215,598, filed Aug. 23, 2011, Final Office Action dated Feb. 6, 2014, 12 pages.
U.S. Appl. No. 13/215,598, filed Aug. 23, 2011 Non-Final Office Action dated Nov. 25, 2014, 18 pages.
U.S. Appl. No. 13/215,598, filed Aug. 23, 2011 Final Office Action dated Jul. 2, 2014, 22 pages.
U.S. Appl. No. 13/215,598, filed Aug. 23, 2011 Final Office Action dated May 5, 2015, 17 pages.

(56) References Cited

OTHER PUBLICATIONS

U.S. Appl. No. 13/215,598, filed Aug. 23, 2011 Non Final Office Action dated Dec. 15, 2015, all pages.
U.S. Appl. No. 13/215,598, filed Aug. 23, 2011 Notice of Allowance dated May 24, 2016, all pages.
U.S. Appl. No. 13/215,655, filed Aug. 23, 2011, Non-Final Office Action dated Sep. 6, 2013, 27 pages.
U.S. Appl. No. 13/215,655, filed Aug. 23, 2011, Final Office Action dated Dec. 18, 2013, 20 pages.
U.S. Appl. No. 13/215,916, filed Aug. 23, 2011, Notice of Allowance dated Jan. 4, 2013, 10 pages.
U.S. Appl. No. 13/294,005, filed Nov. 11, 2011 Notice of Allowance dated Oct. 31, 2014, 24 pages.
U.S. Appl. No. 13/294,005, filed Nov. 11, 2011 Non-Final Office Action dated May 20, 2014, 33 pages.
U.S. Appl. No. 13/294,005, filed Nov. 11, 2011, Non-Final Office Action dated Aug. 14, 2013, 32 pages.
U.S. Appl. No. 13/294,005, filed Nov. 11, 2011, Final Office Action dated Jan. 3, 2014, 29 pages.
U.S. Appl. No. 13/592,976, filed Aug. 23, 2012, Notice of Allowance dated Oct. 7, 2013, 18 pages.
U.S. Appl. No. 13/797,173, filed Mar. 12, 2013 Notice of Allowance dated Nov. 24, 2014, 37 pages.
U.S. Appl. No. 13/797,173, filed Mar. 12, 2013 Notice of Allowance dated Feb. 26, 2015, 19 pages.
U.S. Appl. No. 13/797,173, filed Mar. 12, 2013, Non Final Office Action dated May 15, 2014, 28 pages.
U.S. Appl. No. 13/799,653, filed Mar. 13, 2013 Notice of Allowance dated Nov. 26, 2014, 32 pages.
U.S. Appl. No. 13/799,653, filed Mar. 13, 2013, Non Final Office Action dated May 8, 2014, 24 pages.
U.S. Appl. No. 13/801,968, filed Mar. 13, 2013 Non Final Office Action dated May 21, 2015, 49 pages.
U.S. Appl. No. 13/801,968, filed Mar. 13, 2013 Final Office Action dated Nov. 19, 2015, all pages.
U.S. Appl. No. 13/801,968, filed Mar. 13, 2013 Notice of Allowance dated Apr. 7, 2016, 33 pages.
U.S. Appl. No. 13/829,350, filed Mar. 14, 2013, Non Final Office Action dated Feb. 28, 2014, 29 pages.
U.S. Appl. No. 13/829,350, filed Mar. 14, 2013 Non Final Office Action dated Jul. 29, 2014, 24 pages.
U.S. Appl. No. 13/829,350, filed Mar. 14, 2013 Final Office Action dated Jan. 23, 2015, 18 pages.
U.S. Appl. No. 13/829,350, filed Mar. 14, 2013 Notice of Allowance dated Jul. 24, 2015, 29 pages.
U.S. Appl. No. 13/828,001, filed Mar. 14, 2013, Notice of Allowance dated Apr. 25, 2014, 43 pages.
U.S. Appl. No. 13/799,719, filed Mar. 13, 2013, Non Final Office Action dated Oct. 25, 2013, 79 pages.
U.S. Appl. No. 13/799,719, filed Mar. 13, 2013, Notice of Allowance dated Apr. 23, 2014, 141 pages.
U.S. Appl. No. 13/801,994, Non Final Office Action dated Oct. 7, 2015, 55 pages.
U.S. Appl. No. 13/801,994, Final Office Action dated May 4, 2016, 37 pages.
U.S. Appl. No. 14/589,090, Notice of Allowance dated Feb. 9, 2016, 47 pages.
U.S. Appl. No. 14/860,366, Non-Final Office Action dated Mar. 24, 2017, all pages.
U.S. Appl. No. 14/944,758, Non-Final Office Action dated Jan. 25, 2017, all pages.
U.S. Appl. No. 15/141,304, Non-Final Office Action dated Feb. 28, 2017, all pages.
U.S. Appl. No. 15/141,304, Final Rejection dated Oct. 18, 2017, all pages.
U.S. Appl. No. 15/143,999, filed May 2, 2016, Non-Final Rejection dated Apr. 20, 2017, all pages.
U.S. Appl. No. 15/143,999, filed May 2, 2016, Notice of Allowance dated Aug. 25, 2017, all pages.
U.S. Appl. No. 14/591,549, Non Final Office Action dated Dec. 31, 2015, 19 pages.
U.S. Appl. No. 14/591,549, Final Office Action dated Jun. 30, 2016, all pages.
U.S. Appl. No. 14/591,549, Non Final Office Action dated Dec. 14, 2016, all pages.
U.S. Appl. No. 14/064,423, filed Oct. 28, 2013, Non-Final Office Action dated Dec. 20, 2013, 18 pages.
U.S. Appl. No. 14/064,423, filed Oct. 28, 2013, Notice of Allowance dated Mar. 4, 2013, 37 pages.
U.S. Appl. No. 14/060,388, filed Oct. 22, 2013, Notice of Allowance dated Apr. 13, 2015, 44 pages.
U.S. Appl. No. 13/793,636, filed Mar. 11, 2013, Non-Final Office Action dated Sep. 29, 2014, 27 pages.
U.S. Appl. No. 13/793,636, filed Mar. 11, 2013, Notice of Allowance dated Jan. 28, 2015, 43 pages.
International Search Report of PCT/KR2007/003521 dated Oct. 23, 2007, 22 pages.
International Search Report of PCT/IB2003/005737 dated Mar. 2, 2004, 21 pages.
Jensen, Craig, "Fragmentation: the condition, the cause, the cure" Online!, Executive Software International, 1994; ISBN: 0964004909; retrieved from Internet: <URL: www.executive.com/fragbook/fragbook.htm> * Chapter: "How a disk works", Section: "The original problem". Retrieved on Jan. 9, 2014, 70 pages.
U.S. Appl. No. 14/095,860, filed Dec. 3, 2013 Non-Final Office Action dated Dec. 26, 2014, 45 pages.
U.S. Appl. No. 14/095,860, filed Dec. 3, 2013 Final Office Action dated May 1, 2015, 18 pages.
U.S. Appl. No. 14/095,860, filed Dec. 3, 2013 Notice of Allowance dated Jul. 13, 2015, 31 pages.
U.S. Appl. No. 14/095,860, filed Dec. 3, 2013 Notice of Allowance dated Oct. 19, 2015, 14 pages.
U.S. Appl. No. 14/695,188 Non Final Office Action dated Dec. 30, 2016, all pages.
U.S. Appl. No. 14/695,188 Final Office Action dated Jul. 28, 2017, all pages.
U.S. Appl. No. 14/338,114, filed Jul. 22, 2014 Non-Final Office Action dated Sep. 30, 2015, all pages.
U.S. Appl. No. 14/338,114, filed Jul. 22, 2014 Notice of Allowance dated Feb. 3, 2016, all pages.
U.S. Appl. No. 14/529,989, filed Oct. 31, 2014 Non-Final Office Action dated Nov. 4, 2015, all pages.
U.S. Appl. No. 14/529,989, filed Oct. 31, 2014, Final Rejection dated May 6, 2016, 27 pages.
U.S. Appl. No. 13/795,914, filed Mar. 6, 2013 Notice of Allowance dated Jul. 21, 2014, 13 pages.
U.S. Appl. No. 13/795,914, filed Mar. 6, 2013 Final Office Action dated Apr. 3, 2014, 17 pages.
U.S. Appl. No. 13/795,914, filed Mar. 6, 2013, Non-Final Office Action dated Oct. 11, 2013, 17 pages.
U.S. Appl. No. 13/800,477, filed Mar. 13, 2013 Non-Final Office Action dated Sep. 11, 2014, 34 pages.
U.S. Appl. No. 13/800,477, filed Mar. 13, 2013 Notice of Allowance dated Feb. 18, 2015, 18 pages.
U.S. Appl. No. 14/043,617, filed Oct. 1, 2013 Non-Final Office Action dated Jan. 5, 2015, 45 pages.
U.S. Appl. No. 14/043,617, filed Oct. 1, 2013 Final Office Action dated Jul. 16, 2015, 45 pages.
U.S. Appl. No. 14/043,617, filed Oct. 1, 2013, Final Office Action dated May 6, 2016, 56 pages.
U.S. Appl. No. 14/043,617, filed Oct. 1, 2013, Non-Final Office Action dated Sep. 29, 2016, all pages.
U.S. Appl. No. 14/043,617, filed Oct. 1, 2013, Notice of Allowance dated Dec. 23, 2016, all pages.
U.S. Appl. No. 14/043,617, filed Oct. 1, 2013 Non-Final Office Action dated Oct. 23, 2015, all pages.
U.S. Appl. No. 14/676,137, filed Apr. 1, 2015 Notice of Allowance dated Sep. 28, 2015, 35 pages.
U.S. Appl. No. 15/131,868, filed Apr. 18, 2016 Non-Final Office Action dated Jan. 13, 2017, all pages.
U.S. Appl. No. 15/131,868, filed Apr. 18, 2016 Notice of Allowance dated Jun. 16, 2017, all pages.

(56) References Cited

OTHER PUBLICATIONS

International Preliminary Report on Patentability for PCT/US2013/032176 dated Sep. 25, 2014, 7 pages.
International Search Report and Written Opinion of PCT/US2013/32176 dated Jun. 25, 2013, 15 pages.
International Search Report and Written Opinion of PCT/US2013/031565 dated May 31, 2013, 82 pages.
International Preliminary Report on Patentability for PCT/US2013/031565 dated Sep. 16, 2014, 18 pages.
International Preliminary Report on Patentability for PCT/US2013/031915 dated Sep. 16, 2014, 5 pages.
International Search Report and Written Opinion of PCT/US2013/031915 dated Jun. 3, 2013, 7 pages.
International Search Report and Written Opinion of PCT/US2013/031440 dated May 30, 2013, 14 pages.
European Search Report for EP 12825653 dated Mar. 11, 2015, 7 pages.
Extended European Search Report for EP 12825080 dated Sep. 11, 2014, 10 pages.
Extended European Search Report for EP 12825521 dated Nov. 24, 2014, 7 pages.
Extended European Search Report for EP 12825474 dated Jan. 7, 2015, 6 pages.
Extended European Search Report for EP 12825430 dated Feb. 3, 2015, 9 pages.
Supplementary European Search Report for Application No. EP 12825147 dated Mar. 27, 2015, 9 pages.
Notice of Publication for BR 11 2013 032035-4 dated Dec. 20, 2016, 1 page.
Notice of Publication for BR 11 2013 032380-9 dated Jan. 3, 2017, 1 page.
Notice of Publication for BR 11 2013 032860-6 dated Jan. 24, 2017, 1 page.
Notice of Publication for BR 11 2013 032377-9 dated Jan. 3, 2017, 1 page.
Notice of Publication for BR 11 2014 020064-5 A2 dated Jul. 20, 2017, 1 page.
Office Action for European Application No. 12825147 dated Mar. 7, 2016, all pages.
Office Action for European Application No. 12825147 dated Aug. 23, 2016, all pages.
First Office Action and Search Report for CN Appln No. 201380014409.2 dated Oct. 9, 2016, all pages.
Second Office Action for CN Appln No. 201380014409.2 dated Jun. 7, 2017, all pages.
Supplementary European Search Report for EP 13761291.7 dated Jul. 9, 2015, 8 pages.
Office Action dated Nov. 29, 2016 for EP 13 761 291.7, all pages.
Evans, Brent: "GeekTonic: Jan. 25, 2009-Feb. 1, 2009", Jan. 31, 2009, SP55322053, Retreived from the Internet: URL: http://www.geektonic.com/2009_01_25_archive.html [retrieved on Nov. 23, 2016], 26 pages.
Supplementary European Search Report for EP 13760902 dated Oct. 20, 2015, all pages.
Supplementary European Search Report for EP 13761427 dated Oct. 19, 2015, all pages.
Extended European Search Report for EP 13760237.1 received Jul. 21, 2015, 8 pages.
International Preliminary Report on Patentability for PCT/US2013/031440 dated Sep. 25, 2014, 8 pages.
First Office Action and Search Report from the State Intellectual Property Office (SIPO) for CN 201280031434.7 dated Jul. 17, 2015, 12 pages.
First Office Action and Search Report from the State Intellectual Property Office (SIPO) for CN 201280031150.8, dated Aug. 3, 2016, 10 pages.
Second Office Action from the State Intellectual Property Office (SIPO) for CN 201280031150.8, dated Mar. 27, 2017, all pages.

Decision to Grant from the State Intellectual Property Office (SIPO) for CN 201280031434.7, dated May 12, 2016, all pages. (in Chinese language).
Second Office Action for CN 201280031434.7 dated Dec. 23, 2015, 6 pages.
First Office Action issued by State Intellectual Property Office (SIPO) for CN 201280028697.2, dated Dec. 16, 2015, 11 pages.
Second Office Action issued by State Intellectual Property Office for CN 201280028697.2, dated Jul. 8, 2016, all pages.
Third Office Action issued by State Intellectual Property Office for CN 201280028697.2, dated Dec. 29, 2016, all pages. (entered onto matrix Feb. 2018).
Notice of Allowance received for Mexican Patent Appln. MX/a/2013/014991, dated Dec. 9, 2015, 1 page.
The second Office Action dated Feb. 26, 2015 for Mexican Pat. Appln. No. MX/a/2013/014217 is not translated into English, 3 pages.
The Office Action dated Nov. 7, 2014 for Mexican Patent Application No. MX/a/2013/014907 is not translated into English, 3 pages.
The Office Action dated Jan. 23, 2015 for Mexican Patent Application No. MX/a/2013/014671 is not translated into English, 3 pages.
The Notice of Allowance by the Mexican Institute of Industrial Property for Mexican Patent Application No. MX/a/2013/014671 dated Apr. 17, 2015, 1 page.
First Office Action and Search Report for CN Appln No. 201280030476.9 dated Aug. 9, 2016, all pages.
The Office Action dated Nov. 6, 2014 for Mexican Patent Application No. MX/a/2013/014677 is not translated into English, 2 pages.
The Notice of Allowance by the Mexican Institute of Industrial Property for Mexican Patent Application No. MX/a/2013/014677 dated Mar. 19, 2015 is not translated into English, 1 page.
Office Action dated May 18, 2015 for Mexican Patent Application No. MX/a/2014/009776, 2 pages.
Office Action dated May 12, 2015 for Mexican Patent Application No. MX/a/2014/009723, 2 pages.
Notice of Allowance dated Dec. 4, 2015 for Mexican Patent Application No. MX/a/2014/009723, 1 page.
Notice of Allowance dated Jul. 21, 2016 for Mexican Patent Application No. MX/a/2015/10334, 1 page.
Office Action dated Jul. 31, 2015 for Mexican Patent Application No. MX/a/2014/009928, 2 pages.
Notice of Allowance dated Jan. 15, 2016 for Mexican Patent Application No. MX/a/2014/009928, 1 page.
Office Action dated Jul. 31, 2015 for Mexican Patent Application No. MX/a/2014/009919, 2 pages.
Notice of Allowance dated Jun. 3, 2016 for Mexican Patent Application No. MX/a/2015/009985, 1 page.
Notice of Allowance dated Jun. 6, 2016 for Mexican Patent Application No. MX/a/2015/015383, 1 page.
Notice of Allowance dated Dec. 16, 2015 for Mexican Patent Application No. MX/a/2014/009919, 1 page.
Hee-Yong Kim et al., "DCT Domain Filter for ATV Down Conversion", Consumer Electronics, 1997. Digest of Technical Papers. ICCE., International Conference on, IEEE, Jun. 11, 1997, pp. 142-143, XP032381904, DOI: 10.1109/ICCE. 1997.625904, ISBN: 978-0-7803-3734-3.
Author Unknown, "Digital Video Broadcasting (DVB); Specification for Service Information (SI) in DVB systems," ETSI EN 300 468 V1.1 (Jan. 2013), 172 pages.
Author Unknown, Digital Video Broadcasting (DVB); Content Protection and Copy Management (DVB-CPCM); Part 3: CPCM Usage State Information; European Broadcasting Union Union Europa de Radio-Television, ETSI TS 102 825-3 V1.1.1 (Jul. 2008), XP014042034, 28 pages.
Author Unknown, "EE Launches home TV service in UK," dated Oct. 8, 2014, 3 pages. Retrieved on Oct. 13, 2014 from http://www.bbc.com/news/technology-29535279.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.

(56) References Cited

OTHER PUBLICATIONS

Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.

Author Unknown, "EE TV It's simply great television," Accessed on Oct. 13, 2014, 11 pages. Retrieved from https//ee.co.uk/ee-and-me/ee-tv.

\* cited by examiner

US 10,171,861 B2

RECORDING OF MULTIPLE TELEVISION CHANNELS

CROSS-REFERENCES TO RELATED APPLICATIONS

This Application is a continuation of U.S. patent application Ser. No. 15/143,999, filed May 2, 2016, entitled "Recording of Multiple Television Channels", which is a continuation of U.S. patent application Ser. No. 14/338,114, filed Jul. 22, 2014, entitled "Recording of Multiple Television Channels", which is a continuation of U.S. patent application Ser. No. 13/799,719, filed Mar. 13, 2013, entitled "Recording Of Multiple Television Channels", which claims priority to U.S. provisional application 61/611,483, filed Mar. 15, 2012, entitled "Reception, Recording, Storage, and Manipulation of Multiple Television Channels", the entire disclosures of each application is hereby incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers.

SUMMARY

In some embodiments, a television receiver configured to record multiple television channels concurrently is presented. The television receiver may include a tuner. The television receiver may include one or more processors. The television receiver may include a memory communicatively coupled with and readable by the one or more processors and having stored therein processor-readable instructions. The processor-readable instructions, when executed by the one or more processors, may cause the one or more processors to receive a selection of a television program to record. The television program may be broadcast on a first television channel. The first television channel may be transmitted on a first transponder stream. The instructions may cause the one or more processors to determine a plurality of television channels transmitted as part of the first transponder stream. The instructions may cause the one or more processors to cause a user interface to be presented via a display device that permits a user to select from the plurality of television channels transmitted on the first transponder stream. The instructions may cause the one or more processors to receive a selection of a second television channel from the plurality of television channels. The instructions may cause the one or more processors to, in response to the selection of the first television program to record and the selection of the second television channel from the plurality of television channels, record the first television channel and the second television channel. The first television channel and the second television channel may be received via the tuner.

Embodiments of such a television receiver may include one or more of the following: The first television channel may be broadcast over a first period of time. The second television channel may be broadcast over a second period of time. The first period of time and the second period of time may overlap. The instructions may cause the one or more processors to set a record timer for the television program, wherein the record timer specifies: a television channel, a date, and a time period. The instructions may cause the one or more processors to, in response to the selection of the second television channel of the plurality of television channels, analyze electronic programming guide information for the second television channel. The instructions may cause the one or more processors to determine a first start time of the first record timer occurs during a scheduled broadcast of a second television program on the second television channel. The instructions may cause the one or more processors to set the second record timer for the second television channel having a second start time coinciding with the start time of the second television program for the second television channel. The instructions may cause the one or more processors to, in response to the selection of the second television channel of the plurality of television channels, analyze electronic programming guide information for the second television channel. The instructions may cause the one or more processors to determine a first end time of the first record timer occurs during a scheduled broadcast of a second television program on the second television channel. The instructions may cause the one or more processors to set the second record timer for the second television channel having a second end time coinciding with the end time of the second television program for the second television channel. The tuner may be configured to receive the transponder stream via a single transponder of a satellite. The instructions may cause the one or more processors to receive data from a television service provider that indicates groupings of television channels available to be recorded concurrently using a single tuner.

Additionally or alternatively, embodiments of such a television receiver may include one or more of the following: The instructions may cause the one or more processors to store an indication of the groupings of television channels available to be recorded concurrently using the single tuner. The processor-readable instructions which, when executed by the one or more processors, cause the one or more processors to determine the plurality of television channels transmitted on the first transponder stream may be configured to cause the one or more processors to determine the plurality of television channels transmitted on the first transponder stream available for recording based on the stored indication of the groupings of television channels. The processor-readable instructions which, when executed by the one or more processors, cause the one or more processors to determine the plurality of television channels transmitted on the first transponder stream may be configured to cause the one or more processors to: compare transponder assignments for television channels in a locally-stored data structure to determine groupings of television channels transmitted on the transponder stream; and determine the plurality of television channels transmitted on the first transponder stream based on the compared transponder assignments. The processor-readable instructions which, when executed by the one or more processors, cause the one or more processors to determine the plurality of television channels transmitted on the first transponder stream may be configured to cause the one or more processors to: determine the plurality of television channels transmitted on the first transponder stream wherein, at a given time, each television channel of the plurality of television channels uses a same control word for descrambling.

In some embodiments, a method for recording multiple television channels concurrently is presented. The method may include receiving a selection of a television program to record. The television program may be broadcast on a first television channel. The first television channel may be transmitted on a first transponder stream. The method may include determining a plurality of television channels transmitted as part of the first transponder stream. The method may include causing a user interface to be presented via a display device that permits a user to select from the plurality of television channels transmitted on the first transponder stream. The method may include receiving a selection of a second television channel from the plurality of television channels. The method may include, in response to the selection of the first television program to record and the selection of the second television channel from the plurality of television channels, recording the first television channel and the second television channel. The first television channel and the second television channel may be received via the tuner.

Embodiments of such a method may include one or more of the following: The first television channel may be broadcast over a first period of time. The second television channel may be broadcast over a second period of time. The first period of time and the second period of time may overlap. The method may include setting a record timer for the television program, wherein the record timer specifies: a television channel, a date, and a time period. The method may include, in response to the selection of the second television channel of the plurality of television channels, analyzing electronic programming guide information for the second television channel. The method may include determining a first start time of the first record timer occurs during a scheduled broadcast of a second television program on the second television channel. The method may include setting the second record timer for the second television channel having a second start time coinciding with the start time of the second television program for the second television channel. The method may include, in response to the selection of the second television channel of the plurality of television channels, analyzing electronic programming guide information for the second television channel. The method may include determining a first end time of the first record timer occurs during a scheduled broadcast of a second television program on the second television channel. The method may include setting the second record timer for the second television channel having a second end time coinciding with the end time of the second television program for the second television channel.

The tuner may be configured to receive the transponder stream via a single transponder of a satellite. The method may include receiving data from a television service provider that indicates groupings of television channels available to be recorded concurrently using a single tuner. The method may include storing an indication of the groupings of television channels available to be recorded concurrently using the single tuner. Determining the plurality of television channels transmitted on the first transponder stream may include determining the plurality of television channels transmitted on the first transponder stream are available for recording based on the stored indication of the groupings of television channels. Determining the plurality of television channels transmitted on the first transponder stream may include: comparing transponder assignments for television channels in a locally-stored data structure to determine groupings of television channels transmitted on the transponder stream; and determining the plurality of television channels transmitted on the first transponder stream based on the compared transponder assignments. Determining the plurality of television channels transmitted on the first transponder stream may include determining the plurality of television channels transmitted on the first transponder stream wherein, at a given time, each television channel of the plurality of television channels uses a same control word for descrambling.

In some embodiments, a computer program product residing on a non-transitory processor-readable medium for recording multiple television channels. The computer program product may include processor-readable instructions configured to cause one or more processors to receive a selection of a television program to record. The television program may be broadcast on a first television channel. The first television channel may be transmitted on a first transponder stream. The instructions may be configured to cause the one or more processors to determine a plurality of television channels transmitted as part of the first transponder stream. The instructions may be configured to cause the one or more processors to cause a user interface to be presented via a display device that permits a user to select from the plurality of television channels transmitted on the first transponder stream. The instructions may be configured to cause the one or more processors to receive a selection of a second television channel from the plurality of television channels. The instructions may be configured to cause the one or more processors to, in response to the selection of the first television program to record and the selection of the second television channel from the plurality of television channels, record the first television channel and the second television channel. The first television channel and the second television channel may be received via the tuner. The first television channel may be broadcast over a first period of time. The second television channel may be broadcast over a second period of time. The first period of time and the second period of time may overlap.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
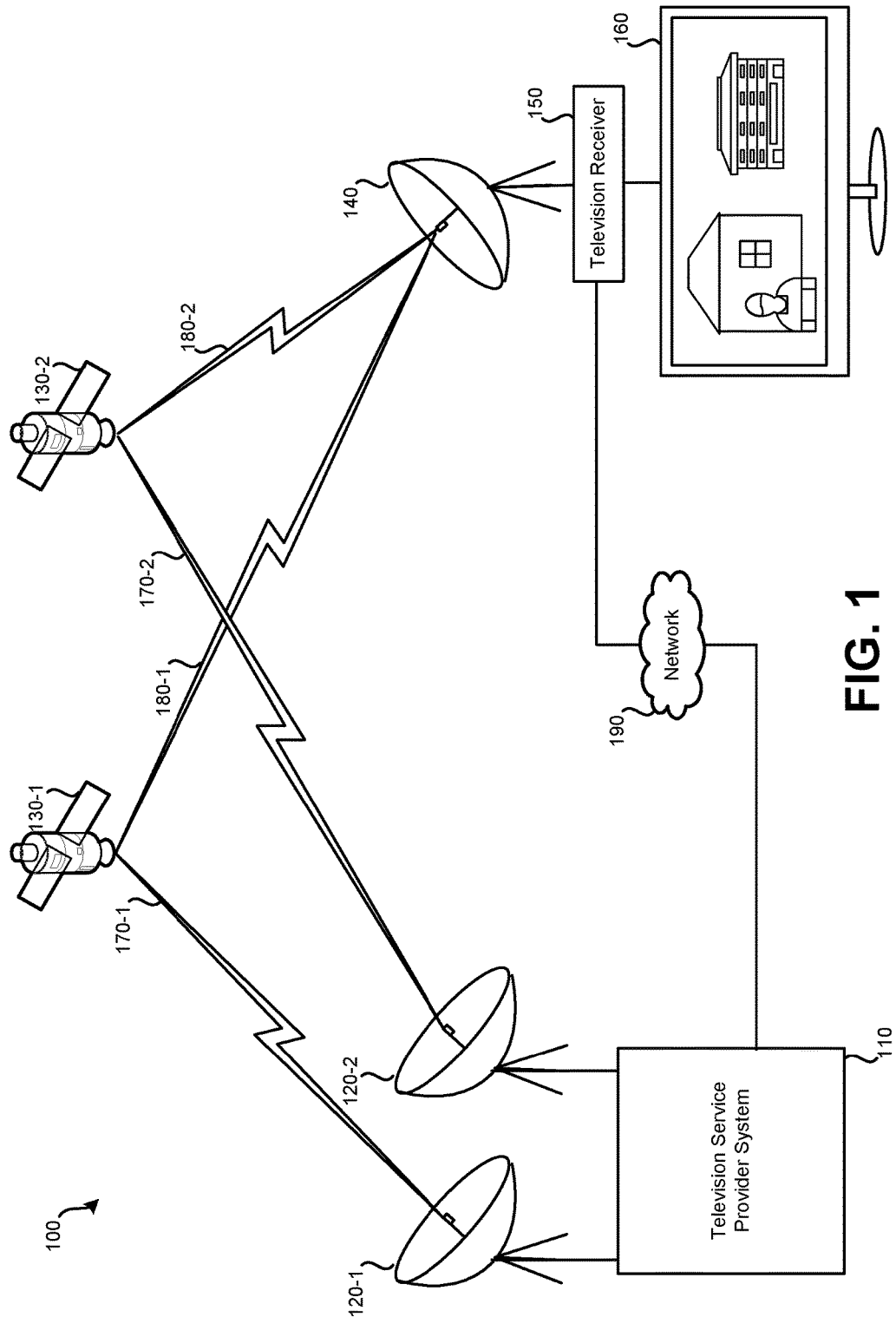
FIG. 1 illustrates an embodiment of a satellite television distribution system.

Conventionally, when recording a television program on a television channel, a television receiver may use a tuner to receive a stream of data at a particular frequency that contains the television channel. Data associated with the television program may then be stored for playback via a display device at a later time. In such conventional arrangements, for each television channel that is recorded, a tuner of the television receiver may be used to receive the stream of data containing the television channel. As such, in a conventional arrangement, the number of television channels recorded concurrently by the television receiver may be greatly restricted. For example, if a television receiver has three tuners, only three different television channels may be recorded at the same time (and/or one or more of these three different television channels may be output for presentation to a display device, such as a television).

In contrast to such conventional arrangements, it may be possible to use a single tuner to receive multiple television channels for recording (and/or presentation) concurrently using a single tuner. Multiple television channels that are transmitted as part of the same data stream (which may be in the form of a transponder stream) may be received using a single tuner. As such, if multiple television channels that a user desires to record are transmitted as part of a same transponder stream, a single tuner of a television receiver may be used to receive the multiple television channels for recording. Therefore, fewer resources of the television receiver may need to be devoted to recording television programs if the television programs are transmitted as parts of the same transponder stream.

Which television channels are assigned to which transponder stream may be decided by the television service provider. As such, a user may have no obvious way of determining which television channels are transmitted as part of the same transponder stream (and thus can be received concurrently using a single tuner of the television receiver). Concurrently receiving multiple television channels may involve a broadcast of the television channels being received over a same period of time. Embodiments detailed herein provide a user with on-screen options for selecting television channels to record via a single tuner.

In some embodiments, a user is presented with an option to select among predefined television channel groups. Each group may contain television channels transmitted to the television receiver as part of a single transponder stream. As such, for each group of television channels to be recorded concurrently, only a single tuner of the television receiver may need to be used. For each group, the specific television channels and/or the date/times at which the television channels within the group are recorded may be defined by the television service provider. In some embodiments, a user may define the record date/times for each group of the television channels.

In some embodiments, a user may be permitted to use an electronic programming guide (EPG) to select a television program for recording. The television receiver may determine which other television channels are also available for recording using the same transponder. The user may then be presented with an on-screen selection indicating one or more other television channels which can be recorded concurrently using a single tuner. The record times of such other television channels may be adjusted such that recording on each of these other television channels begins at a start of a television program and ends at an end of a television program.

FIG. 1 illustrates an embodiment of a satellite television distribution system 100. While embodiments detailed herein may be applied to various television distribution systems, including cable and IP, a satellite television distribution system is provided as an example. Satellite television distribution system 100 may include: television service provider system 110, satellite transmitter equipment 120, satellites 130, satellite dish 140, television receiver 150, and television 160. Alternate embodiments of satellite television distribution system 100 may include fewer or greater numbers of components. While only one satellite dish 140, television receiver 150, and television 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Each satellite 130 may have multiple transponders operating at different transmit frequencies. Multiple satellites 130 may be used to relay television channels from television service provider system 110 to satellite dish 140. Different television channels may be carried using different satellites and/or different transponders. Different television channels may also be carried using different transponders of the same satellite; thus, such television channels may be transmitted at different frequencies and/or different frequency ranges. As an example, a first and second television channel may be carried on a first transponder of satellite 130-1 (and thus be part of a first transponder stream). A third, fourth, and fifth television channel may be carried using a different satellite or a different transponder of the same satellite relaying the transponder stream at a different frequency (and thus be part of a second transponder stream). A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to relay transponder streams from multiple satellites and/or multiple transponders of the same satellite to television receiver 150. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
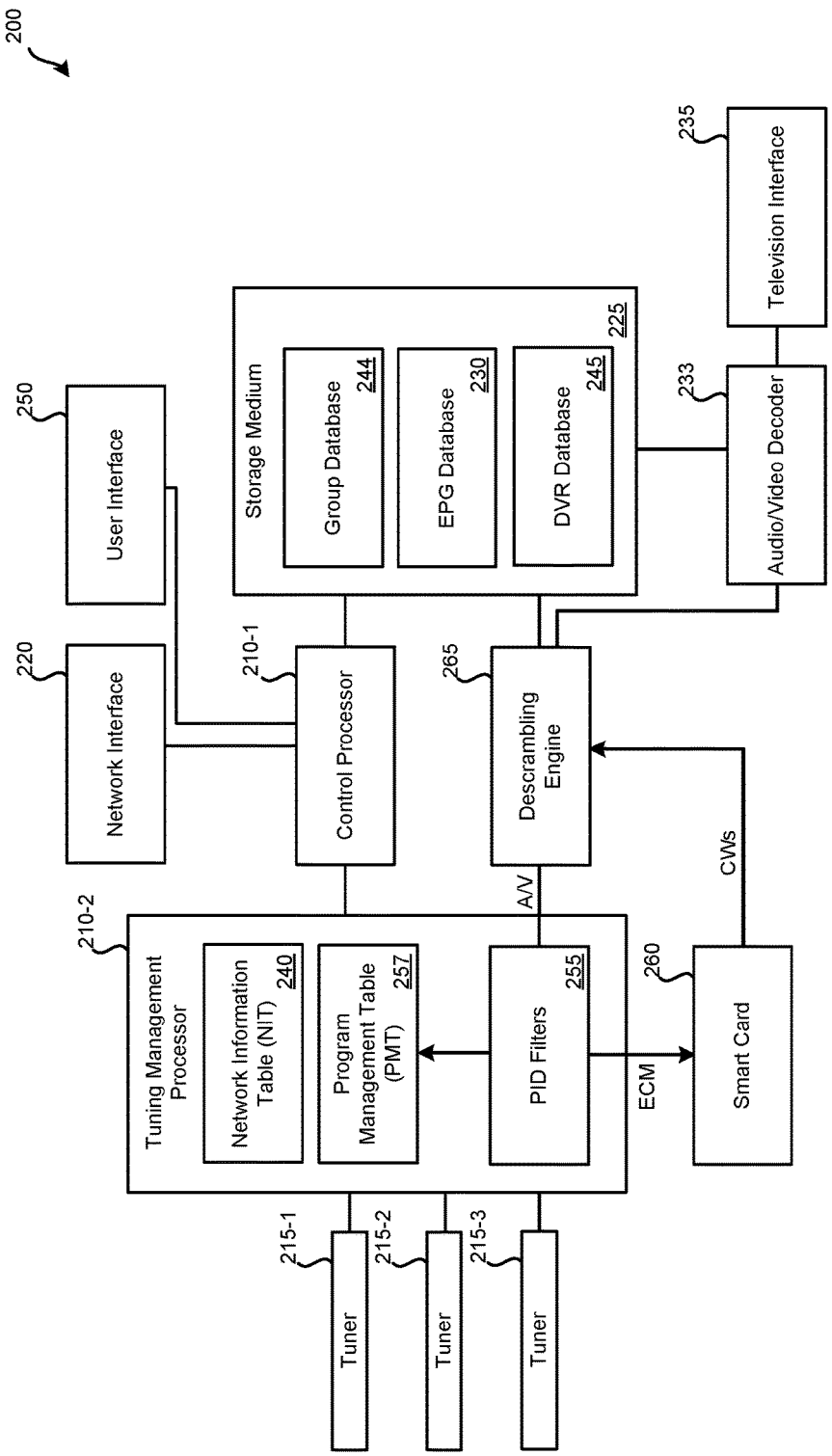
FIG. 2 illustrates an embodiment of a television receiver that is configured to record multiple television channels.

In communication with satellite dish 140 may be one or more sets of receiving equipment. Receiving equipment may be configured to decode signals received from satellites 130 via satellite dish 140 for display on a display device, such as television 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to television 160. FIG. 2 provides additional detail of a television receiver. A television receiver is defined to include set-top boxes (STBs) and also circuitry having similar functionality that may be incorporated with another device. For instance, circuitry similar to that of television receiver 150 may be incorporated into a television. As such, while FIG. 1 illustrates an embodiment of television receiver 150 as separate from television 160, it should be understood that in other embodiments, similar functionality may be present in a television receiver integrated with television 160.

Television 160 may be used to present video and/or audio decoded by television receiver 150. Television receiver 150 may also output a display of one or more interfaces to television 160, such as an electronic programming guide (EPG). In some embodiments, a display device other than a television may be used.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via thirty-two transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 200 and/or may be able to perform some or all of the functions of television receiver 200. Accordingly, instances in this document referring to an STB and steps being performed by an STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be television receiver of FIG. 1 and may be in the form of an STB that communicates with a display device such as a television. Television receiver 200 may be incorporated as part of a television, such as television 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, networking information table (NIT) 240, group database 244, digital video recorder (DVR) database 245, user interface 250, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program management table 257.

Processors 210 may include one or more specialized and/or general-purpose processors configured to perform processes such as tuning to a particular channel, accessing and causing EPG information from EPG database 230 to be displayed, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a single stream of data from a satellite transponder (or a cable RF channel) at a given time. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning. Tuning management processor 210-2 may access network information table 240 and/or program management table 257 to determine a correct transponder stream (a correct satellite and transponder) to which to tune to receive a desired television channel.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, NIT 240 (rather than being stored locally by tuning management processor 210-2), and/or DVR database 245. Recorded television programs may be stored using storage medium 225.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television (or other form of display device) that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. Data from EPG database 230 may be used to present an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels and stored television programming from storage medium 225 (e.g., television programs from DVR database 245 and/or information from EPG database 230) to a television for presentation.

The Network Information Table (NIT) 240 may store information used by television receiver 200 to access various television channels. NIT 240 may be stored locally by a processor, such as by tuning management processor 210-2. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers, frequency identifiers and/or transponder identifiers for various television channels. In some embodiments, NIT 240 may contain additional data or additional tables may be stored by the television receiver. For example, specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, video PIDs, and/or ECM (entitlement control message) PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder |
|---|---|---|
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, a known PMT PID may be used to retrieve a program map table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3. The same PID may be reused on different transponders.

A Digital Video Recorder (DVR) device may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television stations. DVR database 245 may store timers that are used by control processor 210-1 to determine when a television channel should be tuned to and recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to DVR database 245. Using EPG database 230, a user may select a particular television program. Based on the date, time period, and television channel indicated by EPG database 230, Control processor 210-1 may record the associated television program to DVR database 245. Second, DVR database 245 may be used to store recordings of predefined periods of time on one or more television channels defined by a television service provider. These predefined periods of time may include one or more television programs. For example, primetime programming on a particular television network may be recorded each weekday night. Further, multiple television channels may be recorded for such predefined periods of time. Such recording of television channels for predefined periods of time may be defined by the television service provider.

As an example of this second mode of DVR functionality, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight. If a television program is selected for recording by a user and is also specified for recording by the television service provider, the user selection may serve as an indication to save the television program for an extended time (beyond the time which the predefined recording would otherwise be saved).

Further, DVR functionality may include control processor 210-1, or some other processing device of television receive 200, determining multiple television channels that can be recorded simultaneously using a single tuner to receive the multiple television channels. For example, a user may select a particular television program that is to be broadcast on a particular television channel for recording. Based on the television channel selected, control processor 210-1 may access a database, such as group database 244, to determine one or more additional television channels that are transmitted as part of the same transponder stream. In some embodiments, rather than consulting group database 244 to determine which television channels can be received concurrently using a single tuner, control processor 210-1 may examine NIT 240 (or some other data storage arrangement) to identify other television channels associated with the same frequency and/or satellite and transponder.

Group database 244 may store data indicating groups of television channels transmitted using a same transponder stream. As such, each group identified within group database 244 may be received concurrently using a single tuner. The groupings of television channels stored by group database 244 may be transmitted to television receiver 200 by the television service provider. In some embodiments, by analyzing NIT 240 and/or PMT 257, control processor 210-1 may identify the groupings of television channels and store them to group database 244. In some embodiments, rather than constructing group database 244, control processor 210-1 (or some other processing device) may analyze data present in NIT 240, PMT 257, and/or some other data storage arrangement to determine television channels transmitted as part of a same transponder stream.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with a particular television channel. Particular data packets, referred to as entitlement control messages (ECMs), may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording of a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to which to tune. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite) a PID filter may be created based on a PID of PMT data. The PID of PMT data packets may be known because it is stored as part of NIT 240 or another table, such as a PAT. From the PMT data packets, PMT may be constructed by tuning management processor 210-2. Table 2 provides an exemplary extract of a PMT. PMT 257 may be specific to a particular transponder. As such, if tuning to a different transponder occurs, a new PMT may be created for the different transponder.

TABLE 2

| Channel | Video PID | 1st Audio PID | 2nd Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 2 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user, may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
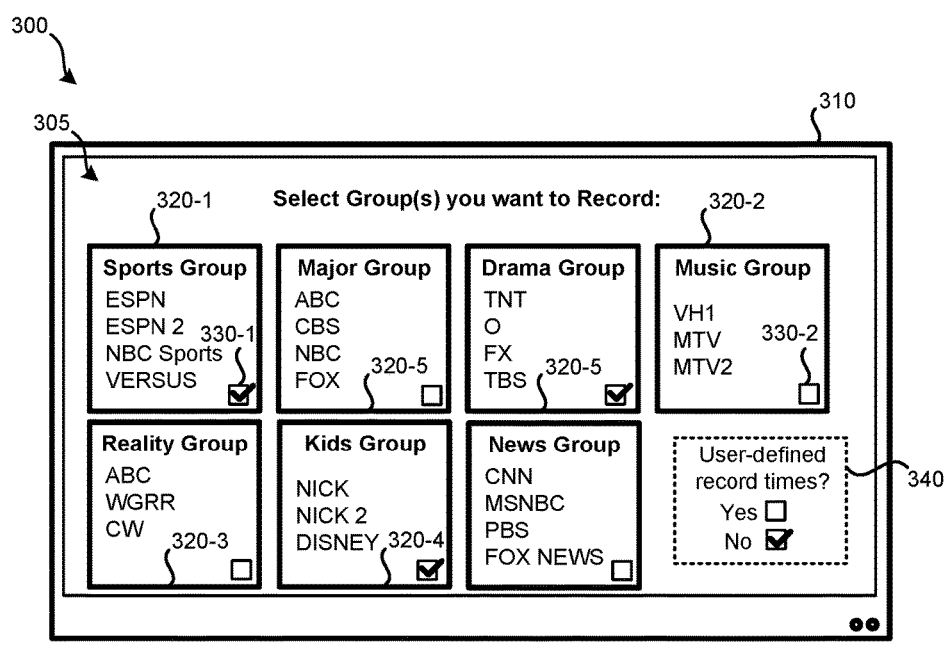
FIG. 3 illustrates an embodiment of on-screen television channel group selections for recording.

FIG. 3 illustrates an embodiment 300 of an on-screen interface for making television channel group selections. In embodiment 300, television 310 is displaying an on-screen user interface 305 that allows for selection among multiple television channel groupings. Such an on-screen user interface 305 may be generated by a television receiver and output to a display device, such as television 310, for display. Television receiver 200 of FIG. 2 or some other television receiver may be used to generate on-screen user interface 305.

Each individual group of television channels in the illustrated embodiment is transmitted using a single transponder stream. As such, a particular group of television channels may be concurrently received using a single tuner of the television receiver. For example, group 320-1 contains four television channels. These four television channels may be received concurrently using a single tuner of a television receiver. Therefore, the television receiver may be able to record some or all of the television channels within group 320-1 concurrently.

In illustrated embodiment 300, television channels are assigned to transponder streams based on content categories. Therefore, a first transponder stream may carry mostly or exclusively a particular category of television channels, while a second transponder stream may carry a different category of television programming. As such, groups for recording may be defined based on content categories. This may be useful to a user because a user likely to record a sports television channel may also be likely to desire concurrent recording of another sports-related television channel. Further, assignment to particular groups (and corresponding transponder streams) may vary based on television programming currently being shown on a television channel. For example, a particular television channel may show football on Sunday afternoons, but may broadcast drama on a weekday night.

In some embodiments, each group corresponds to a particular category of content, such as music for group 320-2. However, it should be understood that other grouping methodologies may be used: groupings may be random, based on channel number, alphabetically, based on anticipated or past popularity, based on user voting, based upon previous data that indicates if a first channel is being recorded which other television channels are also likely to be recorded. It should be understood that still other methodologies may also be used.

In illustrated embodiment 300, the user has selected three groups for recording: group 320-1, group 320-5, and group 320-4. Other available groups, such as group 320-3, have not been selected by a user. Each group may require a single tuner to receive and record (and/or present) each television channel within the group concurrently. It should be understood, in some embodiments, a group may require two or more tuners to receive and record (and/or present) each television channel within the group concurrently. It should also be understood that it may be possible for multiple groups to be received by the television receiver as parts of the same transponder stream. For example, each television channel of group 320-1 and group 320-2 may be transmitted as part of the same transponder stream. Accordingly, in such an embodiment, only a single tuner may be required to receive every television channel in group 320-1 and group 320-2.

A user may use a graphical element, such as checkboxes 330, or some other form of indicator to select one or more groups which the user desires to record. In some embodiments, a user may be able to specify particular television channels within the group that the user desires or does not desire to record. For example, referring to group 320-1, checkbox 330-1 has been checked, thus indicating that the user desires to record all four channels within group 320-1. Checkbox 330-2 is unchecked, indicating the user does not desire the television channels of group 320-2 to be recorded. In other embodiments, a user may be able to select individual television channels within group 320-1 that the user desires to record. By each of these television channels being present within group 320-1, the user may be aware that each of these television channels only requires a single tuner for the television channels to be recorded concurrently (thus allowing other tuners to be assigned to receiving other television channels that are transmitted as part of other transponder streams for either recording and/or presentation).

The dates and/or times for the recording of groups of television channels and/or specific television channels within a group may be either user-defined or television service provider-defined. In some embodiments, if a group of television channels is selected, such as group 320-1, the television service provider may define when those particular television channels are recorded. For example, each television channel within a particular group may be recorded during primetime viewing hours, such as from 7 until 10 PM, on a nightly basis. Accordingly, the data that indicates when particular television channels are to be recorded may be transmitted by the television service provider to the television receiver. Thus, the dates and/or times for which a particular group of television channels are recorded may vary according to the dates and/or times selected by the television service provider.

Dates and/or times selected for recording of particular groups may vary based on when programming on the channels within the group is likely to be desired by a user (as decided by an agent at the television service provider). As an example of this, group 320-5 contains television networks that tend to broadcast new television programs during primetime on weekdays between 7 PM and 10 PM. As such, if the user selects group 320-5 for recording and the television service provider is to select the dates and times for recording, group 320-5 may be recorded on weekdays between 7 PM and 10 PM. In contrast, group 320-4 may tend to show television programming desired to be recorded on weekend mornings. As such, the television service provider may provide data to the television receiver such that group 320-4 is recorded only on weekend mornings. Such arrangements may free the user from having to select when groups 320 are to be recorded.

In some embodiments, the user may be able to define when individual groups of television channels are to be recorded. For example, a user may select a group, such as group 320-1, for recording and also specify dates and/or times for which that group of television channels is to be recorded. The user may be permitted to specify a day of the week (e.g., any selection of days, Sunday through Saturday) and periods of time during the selected days of the week for which the television channels are to be recorded. The user may be permitted to specify different dates and/or times for particular television channels within the group and/or different dates and/or times for different groups. In some embodiments, a user is permitted to select as to whether dates and/or times for recording are defined by the television service provider or by the user.

Selection element 340 may permit a user to specify whether or not the user is to define record times. If "no" is selected, times provided by the television service provider may be used for recording. If "yes" is selected, the user may be prompted for recording dates and/or times. When a user has selected "yes," the default values may be dates/times defined by the television service provider.

The illustrated embodiment 300 of FIG. 3 shows one particular arrangement of how various groups may be presented for selection by a user via a display device by a television receiver. The layout, number of groups, groupings of television channels, and/or graphical elements may vary by embodiment. As such, in other embodiments the presentation of on-screen user interface 305 may vary in content, style, and/or layout.

Figure 4:
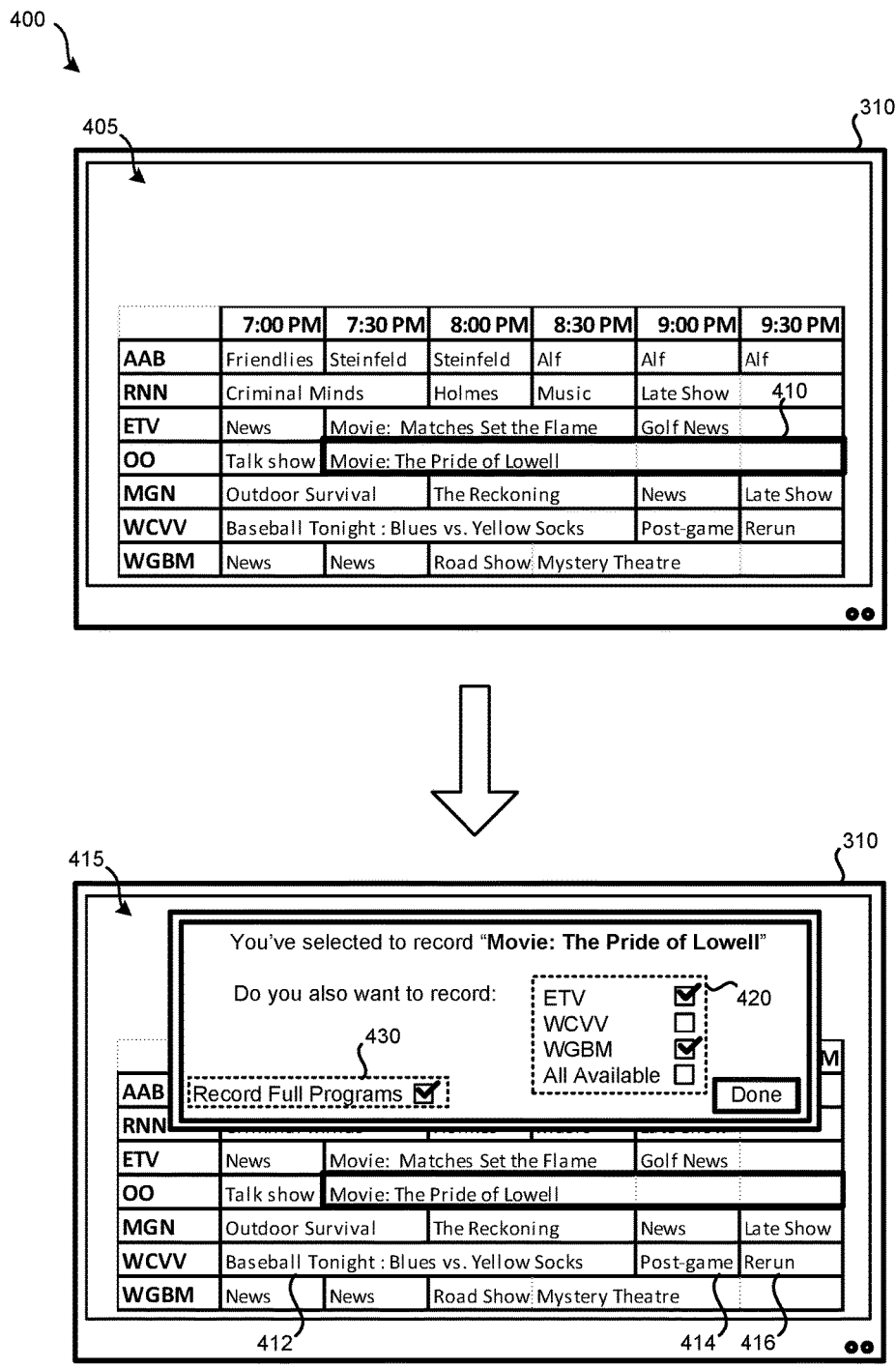
FIG. 4 illustrates an embodiment of on-screen secondary television channel selections for recording.

FIG. 4 illustrates an embodiment 400 of on-screen secondary television channel selections. In embodiment 400, television 310 is displaying an on-screen user interface 405 that allows for selection of a specific television channel for recording. Such an on-screen user interface 405 may be generated by a television receiver and output to a display device, such as television 310, for display. Television receiver 200 of FIG. 2 or some other television receiver may be used to generate on-screen user interface 405.

In the illustrated embodiment 400, a user is using an EPG to select a television program for recording. In the illustrated embodiment, the user has selected television program 410 for recording. This television program appears on a television channel "OO." At least partially based on the selection of the television program and the television channel, a timer may be created and set at the television receiver such that recording of television channel "OO" begins at 7:30 PM and ends at 10:00 PM, such that the entirety of television program 410 is recorded. The television channel associated with the selected television channel may be referred to as the primary television channel.

In response to the selection of television program 410, on-screen user interface 415 may be caused to be displayed. On-screen user interface 415 permits a user to select one or more secondary television channels for recording during a period of time overlapping the broadcast of television program 410. Each of the secondary television channels from which the user is permitted to select may be transmitted to the television receiver using the same transponder stream as television program 410 (and thus primary television channel "OO"). A secondary television channel refers to a television channel selected for recording on a same transponder stream as the primary channel.

In the illustrated embodiment 400, the user is permitted to select among three television channels also transmitted to the television receiver via the same transponder stream as primary television channel "OO." The user may be permitted to select one or more of these secondary television channels for recording. Each of these secondary television channels selected via user interface 420 may be received using the same tuner used to receive the primary television channel and television program 410. As such, an additional tuner may not be necessary to record any of the secondary television channels presented in user interface 420 broadcast during the same time period as the primary television channel is being recorded for television program 410. In some embodiments, rather than listing television channels for selection, television programs appearing on those television channels may be listed for selection. As an example, rather than listing "ETV," a user selection may present to the user for selection whether "Movie: Matches Set the Flame" should be recorded. This movie appears during an overlapping time period on "ETV" as when television program 410 is broadcast on television channel "OO." Additional television programs overlapping the broadcast time of television program 410 may also be listed.

A user may also be permitted via user interface 430 to indicate whether full television programs are to be recorded. Selection of such an option may prevent only portions of television programs from being recorded via secondary recording selections. For example, television program 410, which was selected for recording by the user, is broadcast from 7:30 PM until 10 PM. Television channel WCVV is also transmitted using the same transponder and is available for selection as a secondary recording by the user. However, during an overlapping period of time as when "OO" is broadcasting television program 410, WCVV is broadcasting television program 412 from 7 PM until 9 PM. As such, if WCVV is only recorded during the time period of television program 410, 30 minutes at the beginning of television program 412 may be omitted from recording. By analyzing locally stored EPG information, the television receiver may modify start and stop times of recordings of secondary television channels selected via user interface 420 such that only full television programs are recorded. Accordingly, for example, if WCVV is to be recorded, recording may begin at 7 PM (using the single tuner). In some embodiments, rather than starting recording early, recording may be started late and thus only television programs 414 and 416 on WCVV may be recorded. Similar adjustments may be made to the end time of recording on a secondary television channel; recording of a secondary television channel may run beyond the end time for recording the primary television channel selected by the user for recording or may cease sooner. If the user indicates that full programs are not be recorded, such as via user interface 430, recording on secondary television channels selected via user interface 420 may occur only during the time period during which the primary selected television program is to be recorded (thus possibly resulting in portions of television programs on the secondary television channels being omitted from recording).

The illustrated embodiment 400 of FIG. 4 shows one particular arrangement of how various groups may be presented for selection by a user via a display device by a television receiver. The layout, number of groups, groupings of television channels, and/or graphical elements may vary by embodiment. As such, in other embodiments the presentation of on-screen user interfaces 405 and 415 may vary in content, style, and/or layout.

Figure 4B:
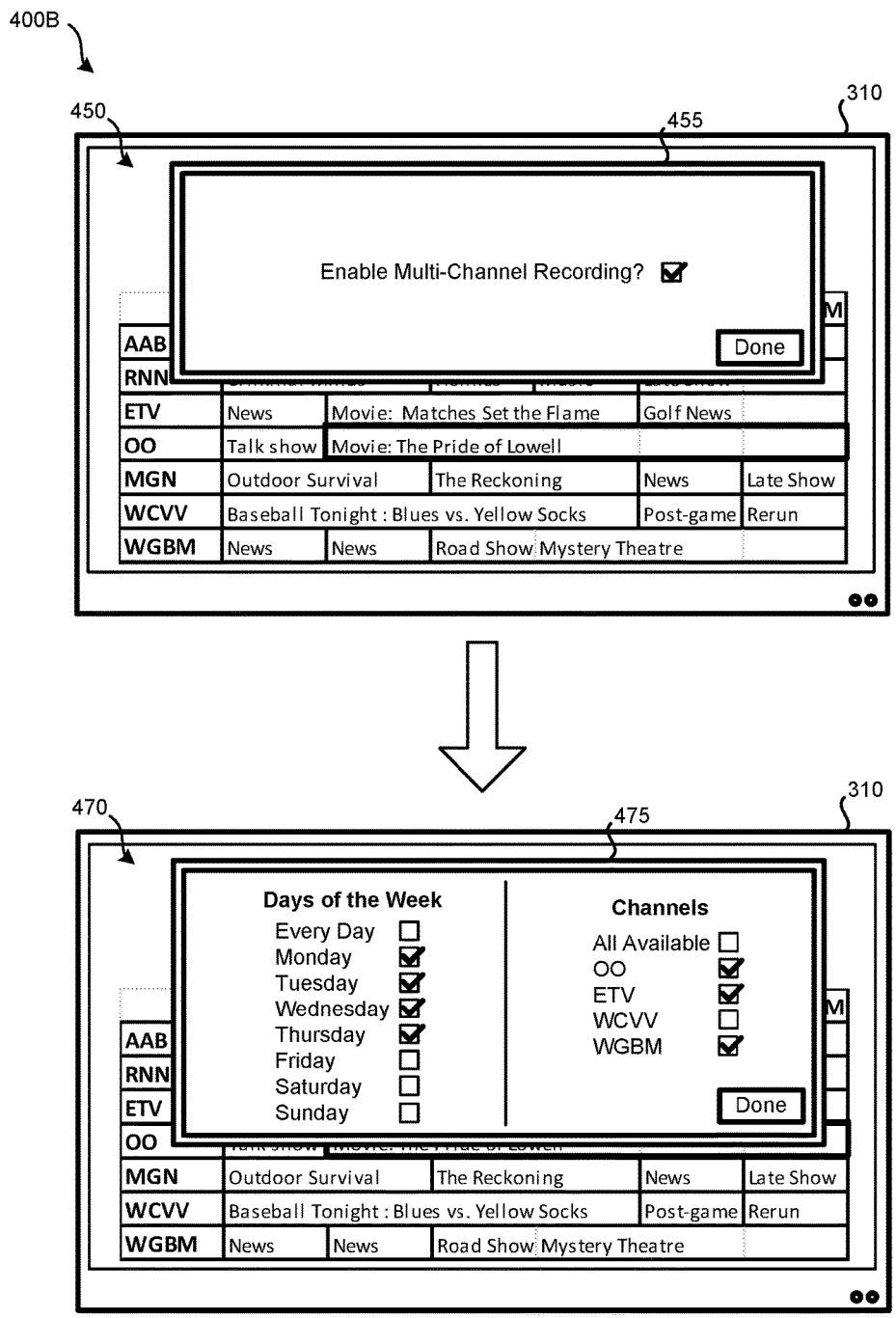
FIG. 4B illustrates an embodiment of on-screen television channel selections for recording.

FIG. 4B illustrates an embodiment 400B of on-screen television channel selections. In embodiment 400B, a user may be permitted to enable or disable recording of multiple television channels that are transmitted to a television receiver as part of a single transponder stream. A single selection by a user, such as via user interface 455, may permit a user to enable or disable recording of multiple television channels that are transmitted as part of a single transponder stream. Enablement of such multi-channel recording may involve each of the multiple television channels being received over overlapping periods of time using a single tuner of the television receiver for receiving the multiple television channels. For example, four television channels may be received as part of a single transponder stream by a single tuner of the television receiver over a same period of time, such as from 7 PM until 10 PM. The specific television channels and the time periods at which the television channels are recorded may be set by the television service provider and transmitted by the television service provider to the television receiver. For example, a user may enable recording of multi-channel recording using a single selection via user interface 455. The time periods and/or channels that are recorded may be determined based on data received by the television receiver from the television service provider.

In some embodiments, if a user enables such multi-channel recording, additional options may be presented to the user, such as via user interface 475. A user may be permitted to specify which days of the week and/or which channels (from a predefined group of television channels) are to be recorded. Each television channel listed in user interface 475 may be transmitted to the television receiver as part of a single transponder stream (such that a single tuner of the television receiver may be used to receive each of the television channels over a same period of time). Without requiring the use of an additional tuner, a user may select as many or as few television channels from user interface 475 for recording. These television channels may be recording during overlapping periods of time using a single tuner of the television receiver.

The user may also be able to specify particular days of the week for recording. For example, a user may not want to record particular days of the week because the user does not find any television programming appearing on the selected television channels on such days to be worth recording for future viewing. A user may also be able to define particular television programs to record or not record. For example, a user may be able to specify (e.g., select from a list) a title of a television program that is never to be recorded. In some embodiments, a user may be able to specify that reruns (i.e., television programs that have been previously broadcast by the television channel) are not to be recorded. Whether a television program is a rerun may be based on determining if an "original broadcast date" stored in the EPG information for a television program matches a current date: if the dates match, the television program may not be a rerun, if the original broadcast date is some day in the past, the television program may be a rerun. Based on whether multi-channel recording is enabled by a user, the days of the week selected by a user, and/or the channels that are part of the transponder stream selected by the user, timers may be configured to record the selected television programming. The specific time periods for each television channel (e.g., from 7-10 PM) may be determined by the television service provider and transmitted to the television receiver. The television receiver may receive from the television service provider timers for each day and channel. Timers for days and/or channels that are not selected for recording by the user may be ignored by the television receiver. For example, in illustrated embodiment 400B, timers related to recording on Saturdays may be ignored. Regardless of the number of television channels selected (from a list of television channels defined by the television service provider) and/or which days of the week (or the number of days of week) selected, only a single tuner may be needed by the television receiver to receive each of the television channels, even if recording occurs on each of the television channels during overlapping periods of time.

The illustrated embodiment 400B of FIG. 4B shows one particular arrangement of how various groups may be presented for selection by a user via a display device by a television receiver. The layout, number of groups, groupings of television channels, and/or graphical elements may vary by embodiment. As such, in other embodiments the presentation of on-screen user interfaces 450 and 470 may vary in content, style, and/or layout.

Figure 5:
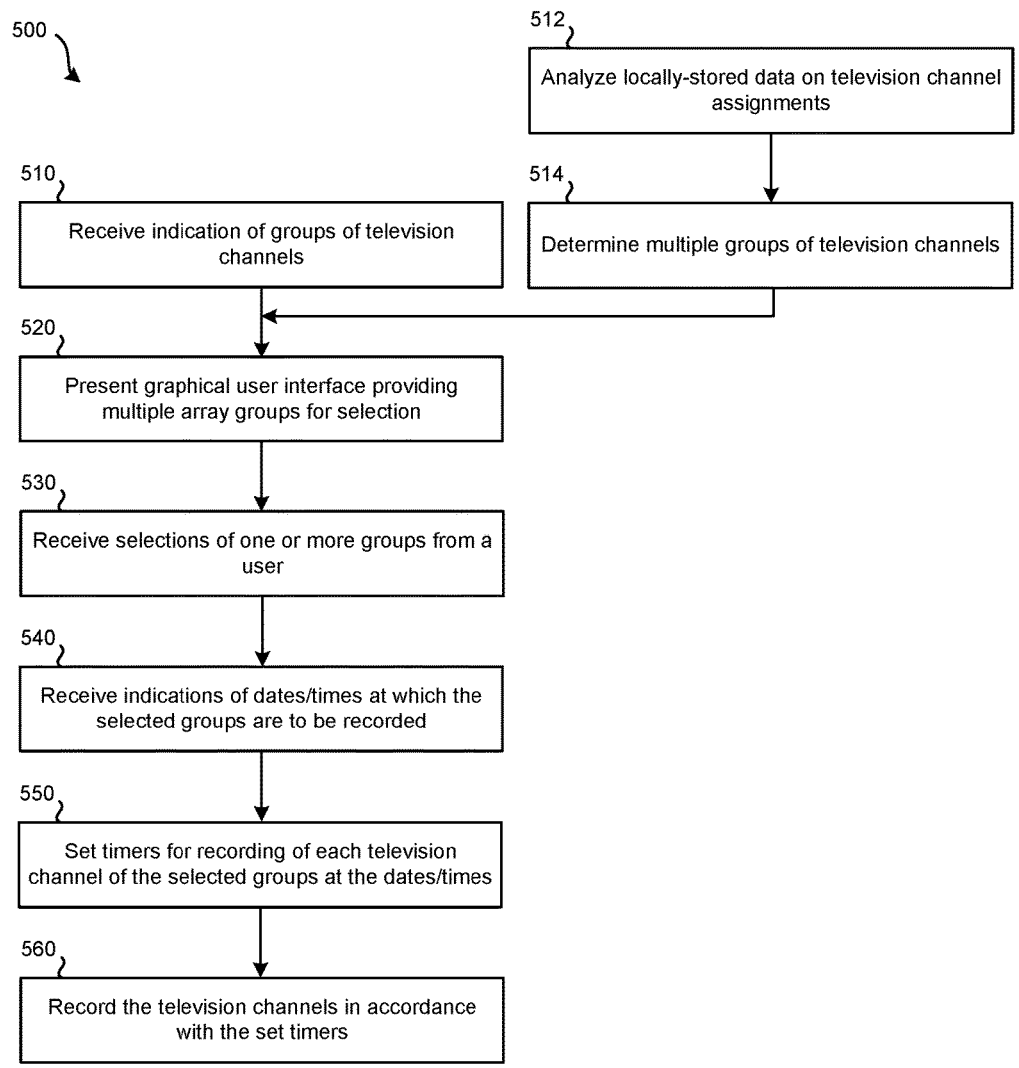
FIG. 5 illustrates an embodiment of a method for recording multiple television channels concurrently.

Various methods may be performed using the previously detailed systems and on-screen interfaces. FIG. 5 illustrates an embodiment of a method 500 for recording multiple television channels concurrently. Method 500 may be performed using satellite television distribution system 100 of FIG. 1 or some other form of television distribution system (which may be cable-based). Method 500 may be performed using a television receiver, such as television receiver 200 of FIG. 2. Each step of method 500 may be performed by a television receiver. In addition to having components similar to television receiver 200 of FIG. 2, computerized components, such as the components of computer system 900 of FIG. 9 may be incorporated as part of the television receiver that performs method 500. Means for performing method 500 include one or more instances of some or all components of television receiver 200 of FIG. 2 and/or computer system 900 of FIG. 9.

At step 510, an indication of television channel groupings may be received by the television receiver. A television service provider may transmit an indication of various television channels which are transmitted to the television receiver via a single transponder stream and, thus, can be received concurrently using a single tuner of the television receiver. Referring to satellite television distribution system 100, such an indication of the television channel groupings may be transmitted to television receiver 150 via satellite or may use some alternate communication route, such as via network 190. It should be understood that in other embodiments of method 500, some other form of communication between a television service provider and a television receiver may be used, such as a cable television network. Such indications of the groups of television channels may be stored by the television receiver, such as by group database 244 of television receiver 200 of FIG. 2.

In some embodiments, rather than receiving an indication of groups of television channels and storing such an indication in a grouping database, a television receiver may be able to analyze locally stored data to determine which television channels are transmitted to the television receiver on a particular transponder and can be received concurrently using a single tuner. At step 512, such analysis may include analyzing data present in an NIT, PMT, and/or some other data storage arrangement that is stored by the television receiver that indicates frequencies or satellites and transponders to which particular television channels are assigned. As such, by determining television channels that are associated with a common frequency or indicate a common satellite and transponder, the television receiver may be able to determine which television channels can be recorded concurrently using a single tuner to receive a single transponder stream at step 514. Further, decryption of control words and/or descrambling using control words may need to be considered as to which television channels can be recorded over the same period of time. For example, it may be necessary for the same control word to be used for descrambling across each television channel within a group. In some embodiments, the results of such a determination may be stored in a group database, such as group database 244 of television receiver 200.

At step 520, a graphical user interface (also referred to as an on-screen user interface) may be presented to a user that indicates various groups of television channels for selection. As an example, embodiment 300 of FIG. 3 illustrates such a graphical user interface. Each group may contain multiple television channels. Each of the television channels contained within the group may be transmitted using a single transponder stream. As such, a single tuner may be used to receive (for recording and/or presentation) each television channel within a group concurrently. Via a user input device, a user may be permitted to select one or more groups of television channels for recording. It may be necessary to determine whether sufficient tuners are available at the television receiver to record the groups selected by the user. For instance, if two or more groups are selected and at least two of the groups are to be recorded concurrently, the television receiver may need to have two available tuners to assign two tuners to record the two groups. For example, a tuner may be reserved by the television receiver to allow the user to watch television channels live. As such, to select two groups, a television receiver may be required to have at least three tuners.

At step 530, selections of one or more groups from the user may be received by the television receiver. In some embodiments, the user may be restricted to selecting a particular number of groups. For example, a user may only be permitted to select a single group for recording. In other embodiments, a user may be able to select 2, 3, 4, 5, or more groups for recording. In some embodiments, a television service provider assigns television channels to particular transponder streams based on categories or some other factor, such as popularity. As such, particular groups of television channels may share characteristics, for example each television channel within a particular group may be devoted to sports, news, or music to name only three examples of categories. Indications of the selected groups of television channels may be stored by the television receiver. In some embodiments, the user is permitted to select particular television channels within a group without selecting the entire group. As such, television channels which are not desired by the user may be ignored and never recorded within a particular group.

At step 540, indications of the dates and/or times which the selected groups of television channels are to be recorded may be received. In some embodiments, these dates and times may be received from a television service provider, such as via a satellite television distribution system. In various embodiments, the television service provider may define when particular television channels and/or particular groups of television channels are to be recorded. In other embodiments, the indications of date and/or times at which groups of television channels are to be recorded may be received from the user of the television receiver. In some embodiments, the user can provide input indicating whether the dates and times are to be set by the user or are to be set by the television service provider. In some embodiments, the television service provider may provide default times and/or dates and the user may be permitted to modify those default times and/or dates. The indications of the dates and/or times at which the selected groups of television channels are to be recorded may be stored by the television receiver.

At step 550, timers for recording of each television channel in the selected groups of television channels may be set for the dates and/or times received at step 540. These timers may be stored by the television receiver. After these timers have been set, it may be permissible for a user to modify the timers and/or cancel recording for a particular date and/or times regardless of whether the dates and/or times were initially specified by the user or by the television service provider.

At step 560, television channels may be recorded according to the timers set at step 550. Multiple television channels present within a group selected by the user may be received for recording using a single tuner of the television receiver. As such, if a user selected a group of television channels for recording at step 530 and the indications of the dates and/or times received at step 540 indicate that each of those television channels are to be recorded concurrently, only a single television tuner may be used to concurrently receive each television channel present within the group. For each television channel recorded at step 560, a separate file may be created on a storage medium of the television receiver. In some embodiments, individual files are created for each television program that is recorded. The start and stop times of particular television programs may be based on EPG data, such as data from EPG database 230 of FIG. 2.

Figure 6:
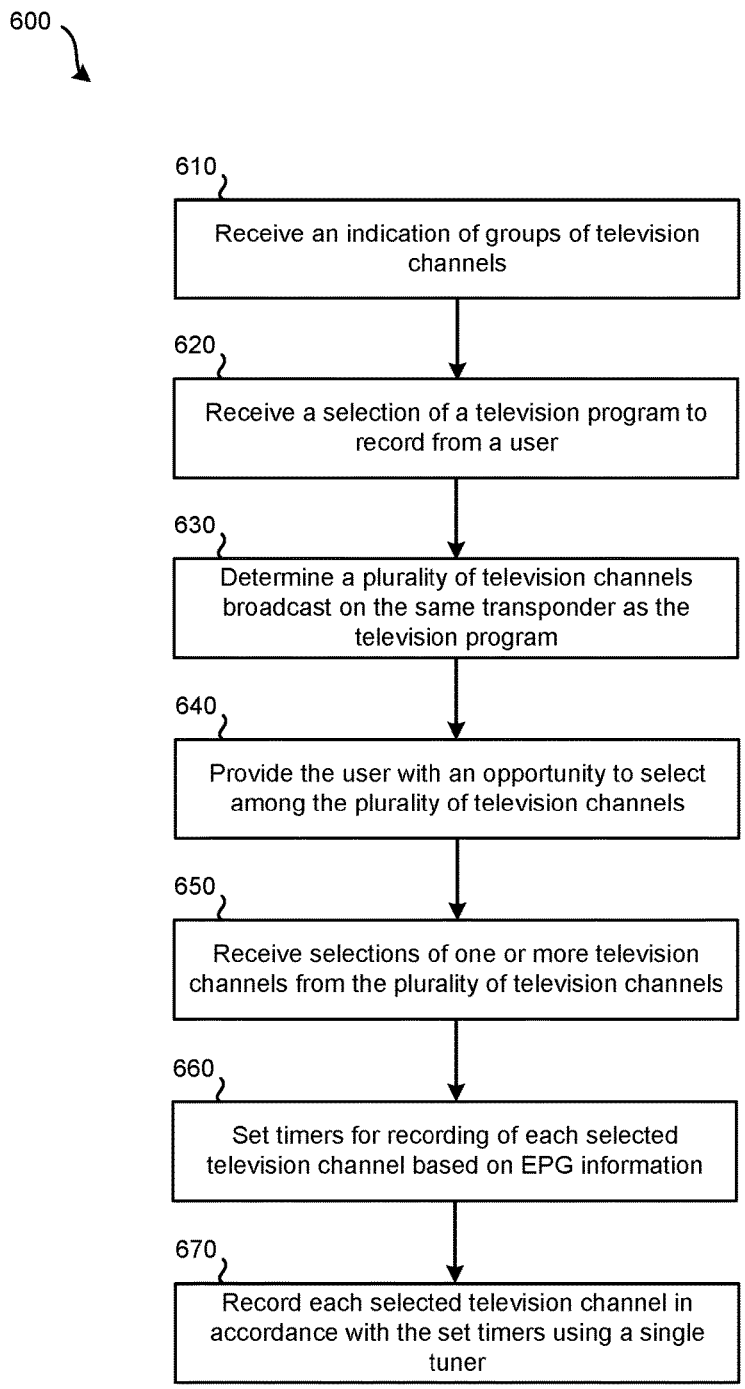
FIG. 6 illustrates another embodiment of a method for recording multiple television channels concurrently.

FIG. 6 illustrates another embodiment of a method for recording multiple television channels concurrently. Method 600 may be performed using satellite television distribution system 100 of FIG. 1 or some other form of television distribution system (which may be cable-based). Method 600 may be performed using a television receiver, such as television receiver 200 of FIG. 2. Each step of method 600 may be performed by a television receiver. In addition to having components similar to television receiver 200 of FIG. 2, computerized components, such as the components of computer system 900 of FIG. 9, may be incorporated as part of the television receiver that performs method 600. Means for performing method 600 include one or more instances of some or all components of television receiver 200 of FIG. 2 and/or computer system 900 of FIG. 9. A television receiver that performs method 500 may also perform method 600.

At step 610, an indication of television channel groupings may be received by the television receiver. A television service provider may transmit an indication of various television channels which are transmitted to the television receiver via a single transponder stream and, thus, can be received concurrently using a single tuner of the television receiver. Referring to satellite television distribution system 100, such an indication of the television channel groupings may be transmitted to television receiver 150 via satellite or may use some alternate communication route, such as via network 190. It should be understood that in other embodiments of method 600, some other form of communication between a television service provider and a television receiver may be used, such as a cable television network. Such indications of the groups of television channels may be stored by the television receiver, such as by group database 244 of television receiver 200 of FIG. 2.

At step 620, a selection of a television program to record may be received from a user. The selection may be made by the user via an EPG interface. For example, referring to FIG. 4, and onscreen EPG may be presented that allows a user to select a particular television program broadcast by a television channel over a time period.

At step 630, multiple other television channels which are broadcast to the television receiver using a same transponder and transponder stream as the television program selected for recording may be determined. These multiple other television channels may be determined based on the indication of groups of television channels received by the television receiver at step 610, such as by analyzing a grouping database. In other embodiments, rather than receiving an indication of groups of television channels and storing such an indication in a grouping database, a television receiver may be able to analyze locally stored data to determine which television channels are transmitted to the television receiver via a particular transponder and can be received concurrently using a single tuner. Such analysis may include analyzing data present in an NIT, PMT, and/or some other data storage arrangement that is stored by the television receiver that indicates frequencies or satellites and transponders to which particular television channels are assigned. By determining television channels that are associated with a common frequency or indicate a common transponder of a same satellite, the television receiver may be able to determine which television channels can be recorded concurrently using a single tuner to receive a single transponder stream at step 630. In some embodiments, the results of such a determination may be stored in a grouping database, such as group database 244 of television receiver 200.

At step 640, an onscreen interface may be presented to a user that identifies the plurality of television channels determined at step 630 to be broadcast on the same transponder as a television program. As such, at step 640, the user may be provided with an opportunity to select among the plurality of television channels to identify which additional television channels are to be recorded by the television receiver. Each of these additional television channels to be recorded may be received by the television receiver using the same tuner used to receive the television program selected at step 620. At step 650, a selection of one or more television channels that are transmitted to the television receiver via the same transponder stream may be received.

At step 660, timers for recording of each user selection, including the television program identified at step 620 and the television channels indicated by the selections received at step 650, may be set by the television receiver. Each timer may include a television channel, a start time, and an end time. The start and end times of timers for the television channels indicated by the selections of step 650 may be adjusted according to method 700 of FIG. 7 such that recording of complete television programs is ensured. In some embodiments, the start and end time of timers of the television channels indicated by the selections of step 650 are set to match the start and end time of the time for the television program identified at step 620 (regardless of whether recording of one or more television programs will be truncated).

At step 670, television channels may be recorded according to the timers set at step 660. Each of the television channels/programs selected for recording in method 600 may require only a single tuner be used for receiving the television programming. For each television channel recorded at step 670, a separate file may be created on a storage medium of the television receiver. In some embodiments, files are created for each television program that is recorded. The start and stop times of particular television programs may be based on EPG data, such as data from EPG database 230 of FIG. 2.

When embodiments of method 600 are performed, it may be desired to ensure that entire television programs recorded such that beginnings and/or endings of television programs are not truncated from recording. As an example, referring to FIG. 4, a user has selected television program 410 for recording. This television program begins at 7:30 PM and ends at 10 PM. Therefore a timer is set by the television receiver to record television program 410 that has a start time of 7:30 PM and an end time of 10:00 PM. However, other television channels transmitted to the television receiver via the same transponder and selected for recording by the user may not have the same start and/or end times. For example, television program 412 on WCVV starts at 7 PM and ends at 9 PM. As such, if the user has indicated that WCVV is to also be recorded during the recording of television program 410, the timing of recording of television channel WCVV may be adjusted such that television program 412 is recorded in its entirety or is omitted from being recorded (rather than having recording start 30 minutes into television program 412).

Figure 7:
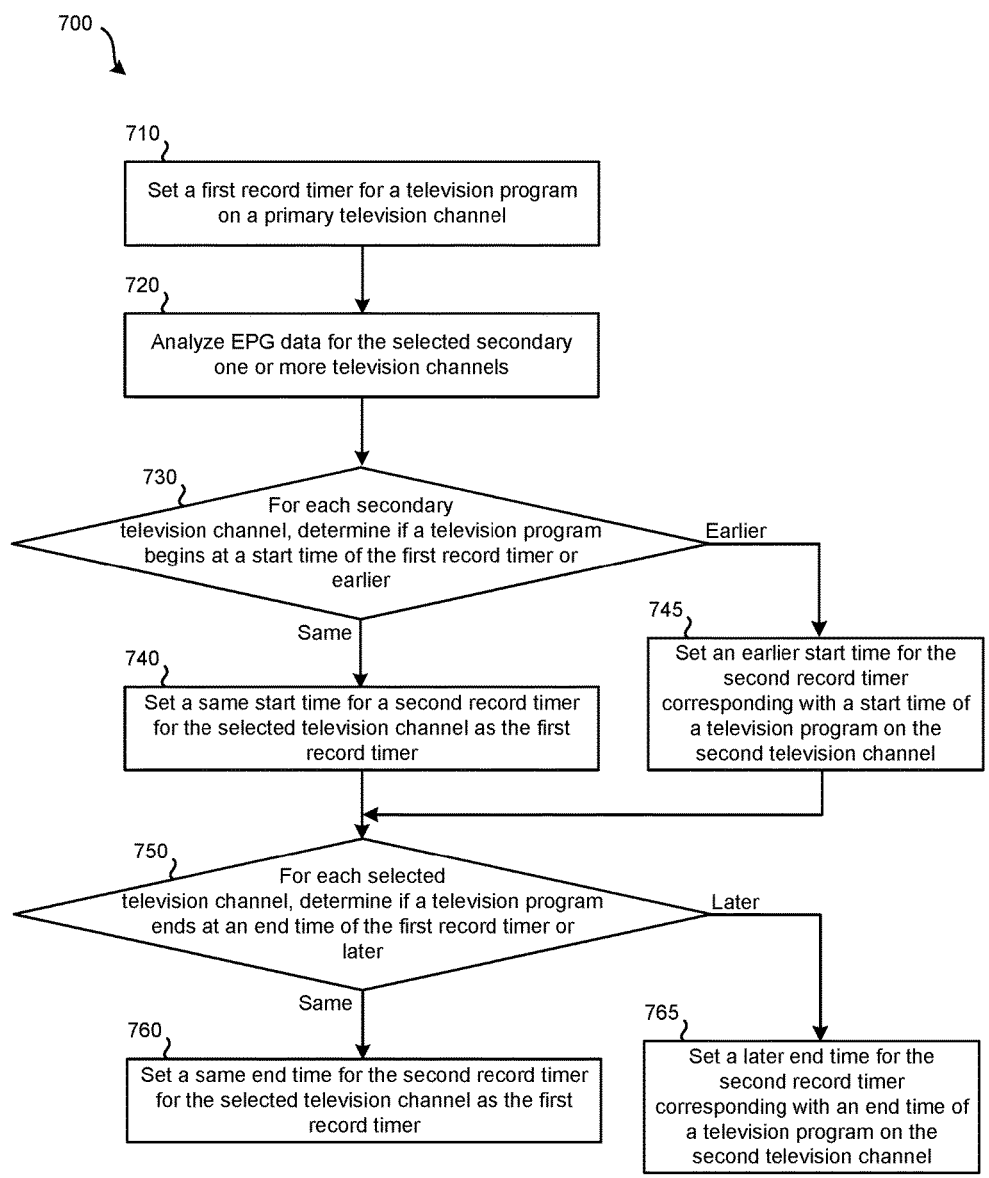
FIG. 7 illustrates an embodiment of a method for using electronic programming guide information to ensure entire television programs are recorded.

FIG. 7 illustrates an embodiment of a method 700 for using electronic programming guide information to ensure entire television programs are recorded. Method 700 may be performed using satellite television distribution system 100 of FIG. 1 or some other form of television distribution system (which may be cable-based). Method 700 may be performed using a television receiver, such as television receiver 200 of FIG. 2. Each step of method 700 may be performed by a television receiver. In addition to having components similar to television receiver 200 of FIG. 2, computerized components, such as the components of computer system 900 of FIG. 9 may be incorporated as part of the television receiver that performs method 600. Means for performing method 700 include one or more instances of some or all components of television receiver 200 of FIG. 2 and/or computer system 900 of FIG. 9. Method 700 may be performed in conjunction with method 500 of FIG. 5 and/or method 600 of FIG. 6 to ensure entire television programs are recorded. For example, referring to method 500, at least some steps of method 700 may be performed as part of step 550. As another example, referring to method 600, method 700 may be performed as part of step 660.

At step 710, a timer may be set for a first television program. This timer may indicate a start time, an end time, a date, and a television channel. Referring to method 600, this timer may be set for the television program indicated by the selection of step 620 (that is, the primary television program selected for recording by the user). In embodiments of method 700 as applied to method 500, rather than setting a first timer for television program at step 710, a time period indicated for recording as received from a user or from a television service provider may be accessed.

At step 720, EPG data received and stored by the television receiver may be analyzed to determine start and end times for television programs appearing on the television channels that are to be recorded. Referring to method 600, each secondary television channel selected for recording at step 650 may have associated EPG data retrieved and/or analyzed.

At step 730, for each selected television channel to be recorded (such as television channels indicated to be recorded at step 650), it may be determined whether a television program begins at the start time of the first record timer or at an earlier time. For example, referring to embodiment 400 of FIG. 4, a timer for television program 410 begins at 7:30 PM. On ETV, a television channel selected for recording, a television program begins at a same time as the start time for the timer. However, referring to WCVV, the television program broadcast at 7:30 begins at 7:00 PM.

If, at step 730, for a secondary television channel to be recorded, it is determined the start time of a scheduled television program on the secondary television channel matches the start time of the timer set at step 710 for the television program on the primary television channel, method 700 may proceed to step 740. At step 740, a start time for a record timer for the secondary television channel to be recorded may be set to match the start time for the record timer of the primary television channel.

If, at step 730, for a secondary television channel to be recorded, it is determined that a scheduled television program on the secondary television channel will be in progress (according to stored EPG information) at the start time of the timer set at step 710 for the television program on the primary television channel, method 700 may proceed to step 745. At step 745, an earlier start time may be set for the record timer for the secondary television channel to match a start time of the television program that is scheduled to be in progress at the start time of the timer set at step 710. The same tuner that will record the first television program may be used to receive each secondary television channel. In some embodiments, rather than setting an earlier start time, a later start time may be set for the record timer for the secondary television channel such that recording of the entire television program that is scheduled to be in progress at the start time of the timer set at step 710 is omitted (thus resulting in a start time for the timer for the secondary television channel being set that is later than the start time of the timer set at step 710). Still, the same tuner that records the first television channel will be used for receiving each secondary television channel.

After step 740 or step 745, step 750 may be performed. At step 750, for each selected television channel to be recorded (such as television channels indicated to be recorded at step 650), it may be determined whether a television program ends at the end time of the first record timer or at a later time. For example, referring to embodiment 400 of FIG. 4 a timer for television program 410 ends at 10:00 PM. On ETV, a television channel selected for recording, a television program ("Golf News") ends at a same time as the end time for the timer. However, referring to "MGN", the television program broadcast at 9:30 may go until 10:30 PM.

If, at step 750, for a secondary television channel to be recorded, it is determined the end time of a scheduled television program on the secondary television channel matches the end time of the timer set at step 710 for the television program on the primary television channel, method 700 may proceed to step 760. At step 760, an end time for a record timer for the secondary television channel to be recorded may be set to match the end time for the record timer of the primary television channel.

If, at step 750, for a secondary television channel to be recorded, it is determined that a scheduled television program on the secondary television channel will be in progress according to stored EPG information at the end time of the timer set at step 710 for the television program on the primary television channel, method 700 may proceed to step 765. At step 765, a later end time may be set for the record timer for the secondary television channel to match an end time of the television program that is scheduled to be in progress at the end time of the timer set at step 710. In some embodiments, rather than setting a later end time, a time may be set for the record timer for the secondary television channel such that recording of the entire television program that is scheduled to be in progress at the end time of the timer set at step 710 is omitted (thus resulting in an end time for the timer for the secondary television channel being set that is earlier than the end time of the timer set at step 710).

Steps 730 through 765 of method 700 may be performed for each secondary television channel to be recorded. The previous description of method 700 focuses on performing steps of method 700 in conjunction with method 600. However, method 700 may also be performed in conjunction with method 500 of FIG. 5. If method 700 is performed in conjunction with method 500, rather than setting a first timer at step 710 for a primary channel, method 700 may begin at step 720 with EPG data being analyzed for each television program to be recorded over a period of time defined by either the television service provider or by a user. The start and end times for recording may, by default, be set for the start of the period of time and the end of the period of time, respectively, defined by the television service provider or user. Steps 720 through 765 may be used to adjust the start time and end time of the recording time period defined by the user or the television service provider such that only complete television programs are recorded.

Figure 8:
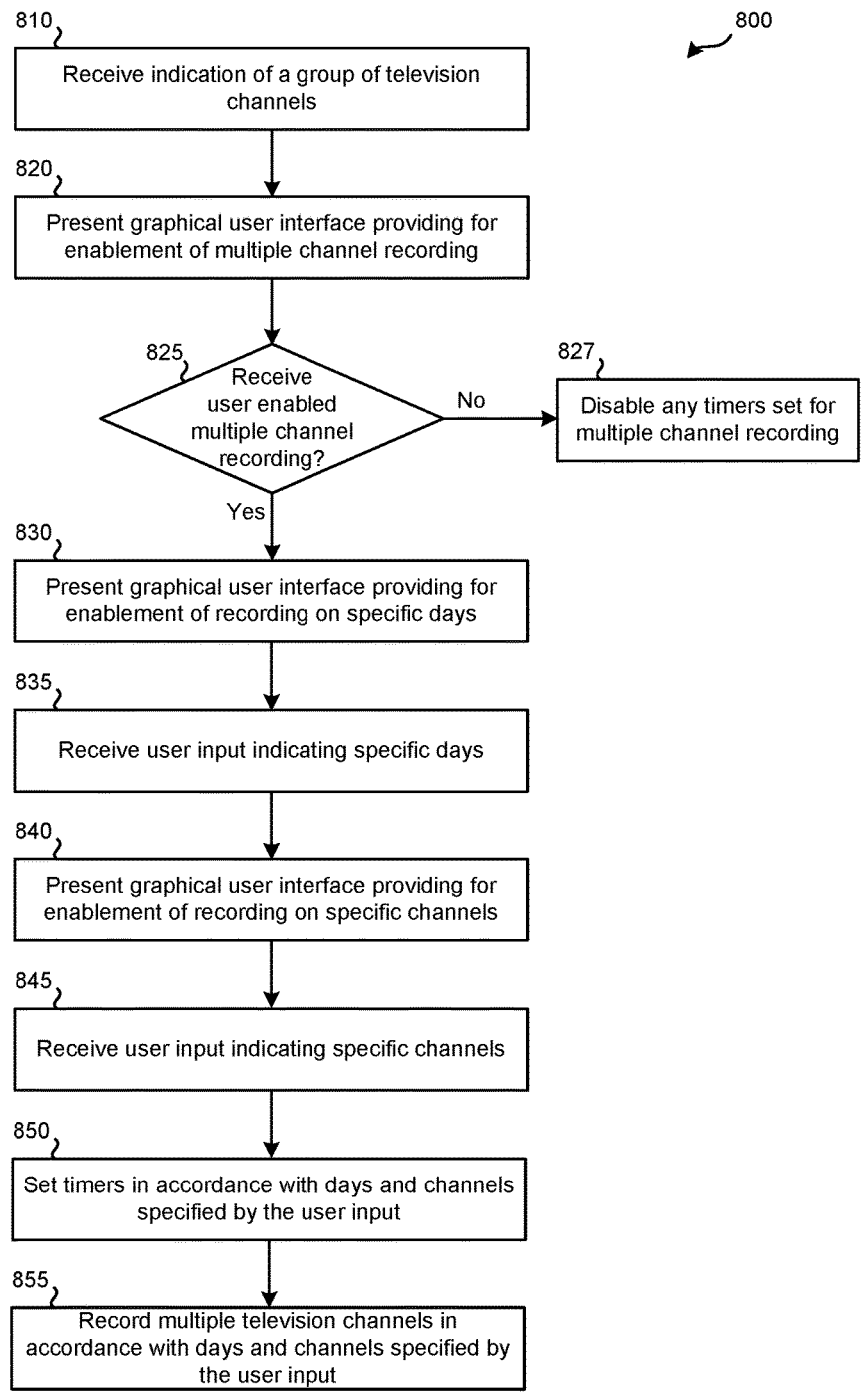
FIG. 8 illustrates an embodiment of a method for recording multiple television channels based on user input.

FIG. 8 illustrates an embodiment of a method 800 for recording multiple television channels based on user input. Method 800 may be performed using satellite television distribution system 100 of FIG. 1 or some other form of television distribution system (which may be cable-based). Method 800 may be performed using a television receiver, such as television receiver 200 of FIG. 2. Each step of method 800 may be performed by a television receiver. In addition to having components similar to television receiver 200 of FIG. 2, computerized components, such as the components of computer system 900 of FIG. 9 may be incorporated as part of the television receiver that performs method 800. Means for performing method 800 include one or more instances of some or all components of television receiver 200 of FIG. 2 and/or computer system 900 of FIG. 9. Method 800 may include the use of user interfaces similar to presented in FIG. 4B.

At step 810, an indication of a group of television channels that are transmitted as part of a same transponder stream may be received by the television receiver. A television service provider may transmit an indication of various television channels which are transmitted to the television receiver via a single transponder stream and, thus, can be received during a same time period (econcurrently) using a single tuner of the television receiver. Referring to satellite television distribution system 100, such an indication of the television channel groupings may be transmitted to television receiver 150 via satellite or may use some alternate communication route, such as via network 190. It should be understood that in other embodiments of method 800, some other form of communication between a television service provider and a television receiver may be used, such as a cable television network. As such, a transponder stream may refer to a stream of television channels transmitted using a single RF channel of the cable network. Such indications of the groups of television channels may be stored by the television receiver, such as by group database 244 of television receiver 200 of FIG. 2.

At step 820, a graphical user interface may be presented to the user by the television receiver (e.g., via a display device) that permits the user to enable or disable multiple channel recording. A single user input may either enable or disable recording of multiple television channels, possibly over an overlapping time period (e.g., daily from 7-10 PM on each of the television channels). Which television channels and the date/time periods over which the television channels are recorded may be defined, at least as a default, by the television service provider. Each of the eligible television channels may be transmitted as part of a particular transponder stream.

At step 825, it may be determined by the television receiver whether the user has selected to enable or disable recording of the multiple channels received using a single tuner of the television receiver. If the user has provided input that disables recording of the multiple channels, method 800 may proceed to step 827. At step 827, no timers may be set for future recording of the multiple channels (e.g., timer data received from the television service provider may be ignored or stored but disabled). Further, any timers previously set for future recording of the multiple channels may be deleted or disabled. If the user has provided input that enables recording of the multiple channels, method 800 may proceed to step 830.

In some embodiments, the television channels, dates, and time periods for recording are determined by the television service provider. As such, following step 825, method 800 may proceed to step 850 in which timers are set according to dates, time periods, and/or television channels that are specified by the television service provider via data that is transmitted by the television service provider to television receiver. In other embodiments, the user may be able to modify which television channels and/or on which dates television channels are recorded. At step 830, another graphical user interface (or an option as part of the same user interface) may be provided that requests the user specify particular days on which recording of the multiple channels is to occur. The user may have the opportunity to specify any combination of days of the week for recording. The user may be able specify that every day of the week is recorded. In some embodiments, the user may provide input for each day of the week which indicates that recording of the multiple channels is enabled or disabled. The time periods on the individual days for recording may be specified by the television service provider (or, in some embodiments, a user may be permitted to indicate the desired periods of time for recording of the television channels). Each time period may include times during which multiple television programs are broadcast. For example, during a time period of 7:00 PM-10:00 PM a particular television channel may broadcast three to six television programs. At step 835, user input may be received by the television receiver that indicates which days of the week the multiple television channels are to be recorded, during which recording, a single tuner for reception of the television channels is used by the television receiver.

At step 840, a user interface may be provided that requests the user specify particular television channels of the multiple channels is to occur. The user may have the opportunity to specify any combination of television channels from the predefined group of television channels. The group of television channels may include only television channels that are transmitted as part of a particular transponder stream. The television channels which are part of the group may have been indicated to the television receiver at step 810. Since the television channels are received as part of the same transponder stream, regardless of the combination of television channels selected by the user, the television channels may be received over at least an overlapping period of time using a single tuner of the television receiver. At step 845, user input may be received by the television receiver that indicates which television channels of the multiple television channels are to be recorded, using a single tuner for reception of the selected television channels.

At step 850, timers may be set for recording of the television channels. Timers may only be set at the set top box for television channels of the multiple television channels selected by the user and only on days selected by the user. The specific time periods for each day may be set by the television service provider. The time periods at which the television channels are recorded may either partially or fully overlap. By the time periods at least partially overlapping, an overlapping time period during which each of the television channels is to be recorded may be defined. For example, each of the television channels may be recorded from 7 PM until 10 PM nightly. The timer set at step 850 may result in channel specific files being recorded for each television channel selected by the user, wherein each channel specific file contains multiple television programs broadcast during the time period recorded by the television receiver. Data used to create timers may be received from the television service provider for recording of each television channel of the multiple television channels for each day of the week. Data for timers related to television channels not selected by the user and/or data for timers on days not selected by the user may be ignored (or stored but disabled), such that timers are only set on the television channels and/or days selected by the user. If, at some point, the user modifies the television channels and/or days selected for recording, one or more corresponding disabled timers may be enabled for recording. At step 855, the television receiver may record the television channels in accordance with the timers set at step 850. Once recorded based on the timers, the recordings of the television channels may be available for playback and output to a display device.

Figure 9:
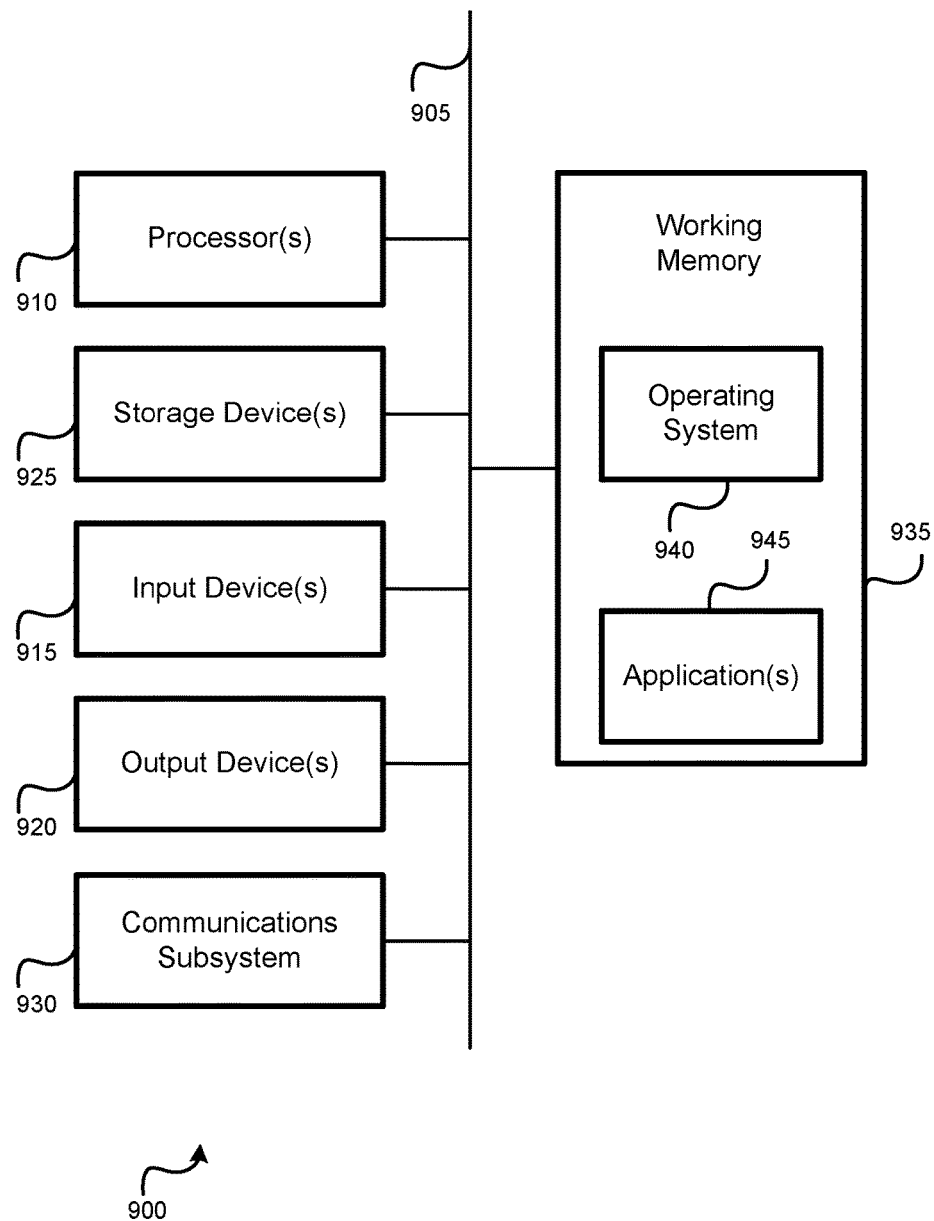
FIG. 9 illustrates an embodiment of a computer system.

FIG. 9 illustrates an embodiment of a computer system 900. A computer system as illustrated in FIG. 9 may be incorporated as part of the previously described computerized devices. For example, computer system 900 can represent some of the components of the television receivers and/or television service provider systems discussed in this application. FIG. 9 provides a schematic illustration of one embodiment of a computer system 900 that can perform various steps of the methods described herein. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard, and/or the like; and one or more output devices 920, which can include without limitation a display device, a printer, and/or the like.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 930 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 925 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 might cause the processor(s) 910 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 900, various computer-readable media might be involved in providing instructions/code to processor(s) 910 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900.

The communications subsystem 930 (and/or components thereof) generally will receive signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

It should further be understood that the components of computer system 900 can be distributed across a network. For example, some processing may be performed in one location using a first processor while other processing may be performed by another processor remote from the first processor. Other components of computer system 900 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A television receiver configured to record multiple television channels, the television receiver comprising:
   a tuner;
   one or more processors; and
   a memory communicatively coupled with and readable by the one or more processors and having stored therein processor-readable instructions which, when executed by the one or more processors, cause the one or more processors to:
   receive a single selection indicative of enablement of multiple channel recording functionality;
   output for presentation a user interface that permits selection of individual channels from a plurality of television channels on a transponder stream in response to receiving the single selection indicative of enabled of multiple channel recording functionality;
   receive a user-defined selection indicative of multiple television channels selected from the plurality of television channels broadcast on the transponder stream, wherein the multiple television channels represent a subset of the plurality of television channels broadcast on the transponder stream, the subset of plurality of television channels to be received via the tuner and recorded concurrently;
   receive an indication of a plurality of time periods for recording from a television service provider; and
   set a plurality of timers to concurrently record on the multiple television channels indicated by the user-defined selection such that recording occurs for the plurality of time periods defined by the television service provider.

2. The television receiver configured to record multiple television channels of claim 1, wherein the memory further comprises processor-readable instructions which, when executed by the one or more processors, cause the one or more processors to:

record the multiple selected television channels, via the tuner, in accordance with the set plurality of timers such that recording of the multiple selected television channels occurs over an overlapping period of time.

3. The television receiver configured to record multiple television channels of claim 1, wherein a timer of the plurality of timers causes multiple television programs to be recorded to a single file stored by the television receiver.

4. The television receiver configured to record multiple television channels of claim 1, wherein presentation of the user interface that permits selection of individual channels from the plurality of television channels on the transponder stream further comprises a single selection being presented that enables recording of every television channel of the plurality of television channels on the transponder stream.

5. The television receiver configured to record multiple television channels of claim 1, wherein presentation of the user interface that permits selection of individual channels from the plurality of television channels on the transponder stream further comprises one or more days of the week to be selected from a plurality of days of the week.

6. The television receiver configured to record multiple television channels of claim 1, wherein the memory further comprises processor-readable instructions which, when executed by the one or more processors, cause the one or more processors to:

receive an indication of one or more television programs that are to be skipped from recording on the multiple television channels.

7. The television receiver configured to record multiple television channels of claim 6, wherein the memory further comprises processor-readable instructions which, when executed by the one or more processors, cause the one or more processors to:

in response to the received indication, set the plurality of timers to skip recording the one or more television programs that are to be skipped from recording on the multiple television channels.

8. The television receiver configured to record multiple television channels of claim 7, wherein the indication indicates that reruns are to be skipped and the memory further comprises processor-readable instructions which, when executed by the one or more processors, cause the one or more processors to:

identify the one or more television programs as reruns based on an original broadcast date of the one or more television programs retrieved from electronic programming guide data predating a current date.

9. A method for recording multiple television channels, the method comprising:

receiving, by a television receiver, a single selection indicative of enablement of multiple channel recording functionality;

outputting, by the television receiver, for presentation a user interface that permits selection of individual channels from a plurality of television channels on a transponder stream in response to the single selection;

receiving, by the television receiver, a user-defined selection indicative of multiple television channels selected from the plurality of television channels broadcast on the transponder stream, wherein the multiple television channels represent a subset of the plurality of television channels broadcast on the transponder stream, the subset of plurality of television channels to be received via a single tuner and recorded concurrently;

receiving, by the television receiver, an indication of a plurality of time periods for recording from a television service provider; and setting, by the television receiver, a plurality of timers to record the multiple television channels such that recording occurs for the plurality of time periods defined by the television service provider.

10. The method for recording multiple television channels of claim 9, further comprising:

recording, by the television receiver, the multiple selected television channels, via the tuner, in accordance with the set plurality of timers such that recording of the multiple selected television channels occurs over an overlapping period of time.

11. The method for recording multiple television channels of claim 9, wherein multiple television programs on a television receiver are recorded to a single file stored by the television receiver.

12. The method for recording multiple television channels of claim 9, wherein presentation of the user interface that permits selection of individual channels from the plurality of television channels on the transponder stream further comprises a single selection that enables recording of every television channel of the plurality of television channels on the transponder stream.

13. The method for recording multiple television channels of claim 9, wherein presentation of the user interface that permits selection of individual channels from the plurality of television channels on the transponder stream further comprises presentation of a plurality of days of the week for selection.

14. The method for recording multiple television channels of claim 9, the method further comprising:

receiving, by the television receiver, an indication of one or more television programs that are to be skipped from recording on the multiple television channels.

15. The method for recording multiple television channels of claim 14, the method further comprising:

in response to the received indication, setting the plurality of timers to skip recording the one or more television programs that are to be skipped from recording on the multiple television channels.

16. The method for recording multiple television channels of claim 15, wherein the indication indicates that reruns are to be skipped and the method further comprising:

identifying, by the television receiver, the one or more television programs being reruns based on an original broadcast date of the one or more television programs retrieved from electronic programming guide data predating a current date.

17. A non-transitory processor-readable medium for recording multiple television channels at a television receiver, comprising processor-readable instructions configured to cause one or more processors to:

receive a single selection indicative of enablement of multiple channel recording functionality;

output for presentation a user interface that permits selection of individual channels from a plurality of television channels on a transponder stream in response to the received single selection;

receive a user-defined selection indicative of multiple television channels selected from the plurality of television channels broadcast on the transponder stream, wherein the multiple television channels represent a subset of the plurality of television channels broadcast on the transponder stream, the subset of plurality of television channels to be received via a single tuner and recorded;

receive an indication of a plurality of time periods for recording from a television service provider; and set a plurality of timers to concurrently record on the multiple television channels indicated by the user-defined selection such that recording occurs for the plurality of time periods defined by the television service provider.

18. The non-transitory processor-readable medium for recording multiple television channels at the television receiver of claim 17, wherein the processor-readable instructions are further configured to cause the one or more processors to:

record the multiple selected television channels, via a single tuner, in accordance with the set plurality of timers such that recording of the multiple selected television channels occurs over an overlapping period of time.

19. The non-transitory processor-readable medium for recording multiple television channels at the television receiver of claim 17, wherein a timer of the plurality of timers causes multiple television programs to be recorded to a single file stored by the television receiver.

20. The non-transitory processor-readable medium for recording multiple television channels of claim 17, wherein the processor-readable instructions are further configured to cause the one or more processors to:

receive an indication that reruns are to be skipped from recording on the multiple television channels;

identify one or more reruns based on an original broadcast date of each of the one or more reruns, wherein the original broadcast date retrieved from electronic programming guide data for each of the one or more reruns predates a current date; and in response to the received indication, setting the plurality of timers to skip recording of the one or more reruns on the multiple television channels.

* * * * *